(12) United States Patent
Lee et al.

(10) Patent No.: US 11,979,437 B2
(45) Date of Patent: May 7, 2024

(54) SYSTEM AND METHOD FOR REGISTERING DEVICE FOR VOICE ASSISTANT SERVICE

(71) Applicant: SAMSUNG ELECTRONICS CO., LTD., Suwon-si (KR)

(72) Inventors: Hojung Lee, Suwon-si (KR); Hyeonmok Ko, Suwon-si (KR); Hyungrai Oh, Suwon-si (KR); Inchul Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/313,076

(22) Filed: May 5, 2023

(65) Prior Publication Data

US 2023/0275937 A1 Aug. 31, 2023

Related U.S. Application Data

(63) Continuation of application No. 16/942,251, filed on Jul. 29, 2020, now Pat. No. 11,695,809.

(Continued)

(30) Foreign Application Priority Data

Oct. 10, 2019 (KR) .................. 10-2019-0125679

(51) Int. Cl.
*H04L 65/1073* (2022.01)
*G10L 15/06* (2013.01)
(Continued)

(52) U.S. Cl.
CPC ........ *H04L 65/1073* (2013.01); *G10L 15/063* (2013.01); *G10L 15/22* (2013.01);
(Continued)

(58) Field of Classification Search
CPC ............. H04L 65/1073; H04L 65/1059; G10L 15/063; G10L 15/22; G10L 15/30;
(Continued)

(56) References Cited

U.S. PATENT DOCUMENTS 9,213,698 B1 * 12/2015 Tsypliaev ............... G06F 16/256
9,443,527 B1 * 9/2016 Watanabe ............... G10L 15/30
(Continued)

FOREIGN PATENT DOCUMENTS

| KR | 10-2015-0068013 A | 6/2015 |
| KR | 10-2017-0049817 A | 5/2017 |
| KR | 10-2019-0075870 A | 7/2019 |

OTHER PUBLICATIONS

International Search Report (PCT/ISA/210) and Written Opinion (PCT/ISA/237) dated Oct. 30, 2020 by the InternationalSearching Authority in counterpart International Patent Application No. PCT/KR2020/009993.

(Continued)

*Primary Examiner* — Michael Colucci
(74) *Attorney, Agent, or Firm* — Sughrue Mion, PLLC

(57) ABSTRACT

A system and method for registering a new device for a voice assistant service. The method, performed by a server, of registering a new device for a voice assistant service includes: comparing functions of a pre-registered device with functions of the new device; identifying functions corresponding to the functions of the pre-registered device among the functions of the new device, based on the comparison; obtaining pre-registered utterance data related to at least some of the identified functions; generating action data for the new device based on the identified functions and the pre-registered utterance data.

15 Claims, 26 Drawing Sheets

| AUTOMATIC DRYING FUNCTION IS A NEW FUNCTION | ⇨ | SHALL WE REGISTER AN UTTERANCE SENTENCE 'EXECUTE THE DRYING FUNCTION WHEN TURNING OFF THE AIR CONDITIONER'? | ⇨ | EXECUTE THE DRYING FUNCTION WHEN TURNING OFF THE AIR CONDITIONER ↔ CHECK RECEPTION OF A POWER OFF INPUT + DRYING FUNCTION ON + AIR CONDITIONER POWER OFF |

Related U.S. Application Data

(60) Provisional application No. 62/879,638, filed on Jul. 29, 2019.

(51) Int. Cl.
    *G10L 15/22*     (2006.01)
    *G10L 15/30*     (2013.01)

(52) U.S. Cl.
    CPC ...... *G10L 15/30* (2013.01); *G10L 2015/0635* (2013.01); *G10L 2015/223* (2013.01)

(58) Field of Classification Search
    CPC ....... G10L 2015/0635; G10L 2015/223; G10L 12/265; G10L 15/08; G10L 21/00; G06F 3/167; G06F 40/211; G06F 40/30
    See application file for complete search history.

(56) References Cited

U.S. PATENT DOCUMENTS

| | | | |
|---|---|---|---|
| 10,269,344 | B2 | 4/2019 | Lee et al. |
| 10,572,107 | B1* | 2/2020 | Beebe ..................... G06F 3/167 |
| 10,623,246 | B1* | 4/2020 | Iyer ..................... H04L 41/0806 |
| 11,189,268 | B2 | 11/2021 | Park et al. |
| 2002/0161572 | A1 | 10/2002 | Kusumoto |
| 2003/0210770 | A1* | 11/2003 | Krejcarek ............. H04M 7/006 379/88.01 |
| 2005/0021714 | A1 | 1/2005 | Yook et al. |
| 2009/0157404 | A1* | 6/2009 | Brown .................... G10L 15/19 704/257 |
| 2010/0185445 | A1* | 7/2010 | Comerford ............. G10L 15/06 704/E15.001 |
| 2011/0054899 | A1* | 3/2011 | Phillips .................... G10L 15/30 704/235 |
| 2012/0271639 | A1 | 10/2012 | Hanson |
| 2014/0129222 | A1 | 5/2014 | Okamoto |
| 2016/0104480 | A1* | 4/2016 | Sharifi ................. G10L 15/285 704/254 |
| 2017/0004830 | A1* | 1/2017 | van der Vlugt ........ G10L 15/22 |
| 2018/0033438 | A1* | 2/2018 | Toma ..................... G10L 17/04 |
| 2018/0233137 | A1* | 8/2018 | Torok ..................... G06F 3/167 |
| 2018/0277113 | A1* | 9/2018 | Hartung .................. G10L 15/08 |
| 2019/0066670 | A1 | 2/2019 | White et al. |
| 2019/0206411 | A1* | 7/2019 | Li ............................ G06F 3/167 |
| 2021/0056962 | A1* | 2/2021 | McMahon ........... G10L 15/1822 |
| 2021/0097158 | A1* | 4/2021 | Lee .......................... G06F 21/45 |

OTHER PUBLICATIONS

Communication dated Jul. 25, 2022 by the European Patent Office in corresponding patent application No. 20847632.5.
Communication dated Jan. 2, 2023, issued by the European Patent Office in counterpart European Application No. 20847632.5.
Notice of Allowance dated Oct. 17, 2023, issued by European Patent Office in European Patent Application No. 23167998.6.

\* cited by examiner

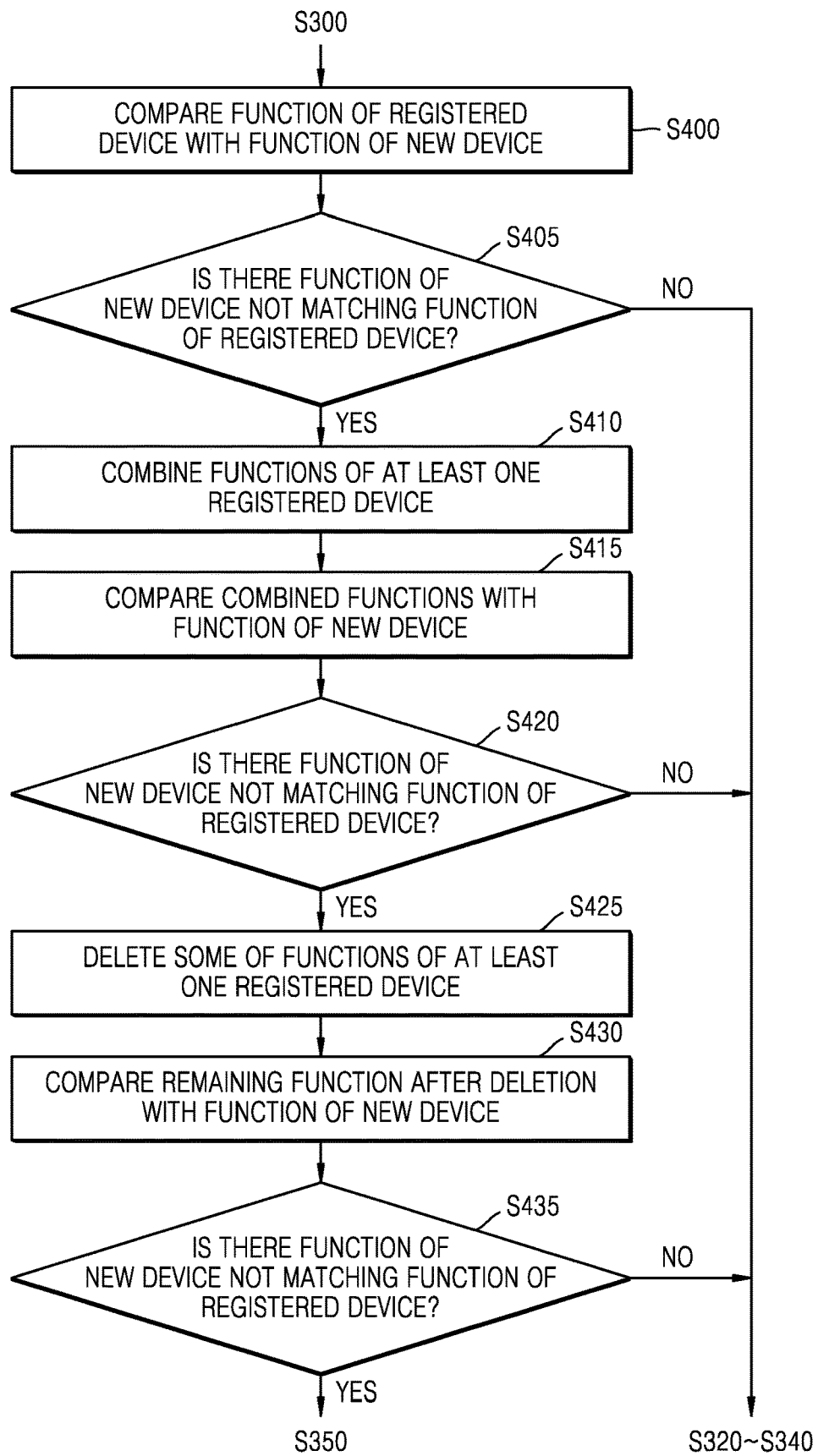

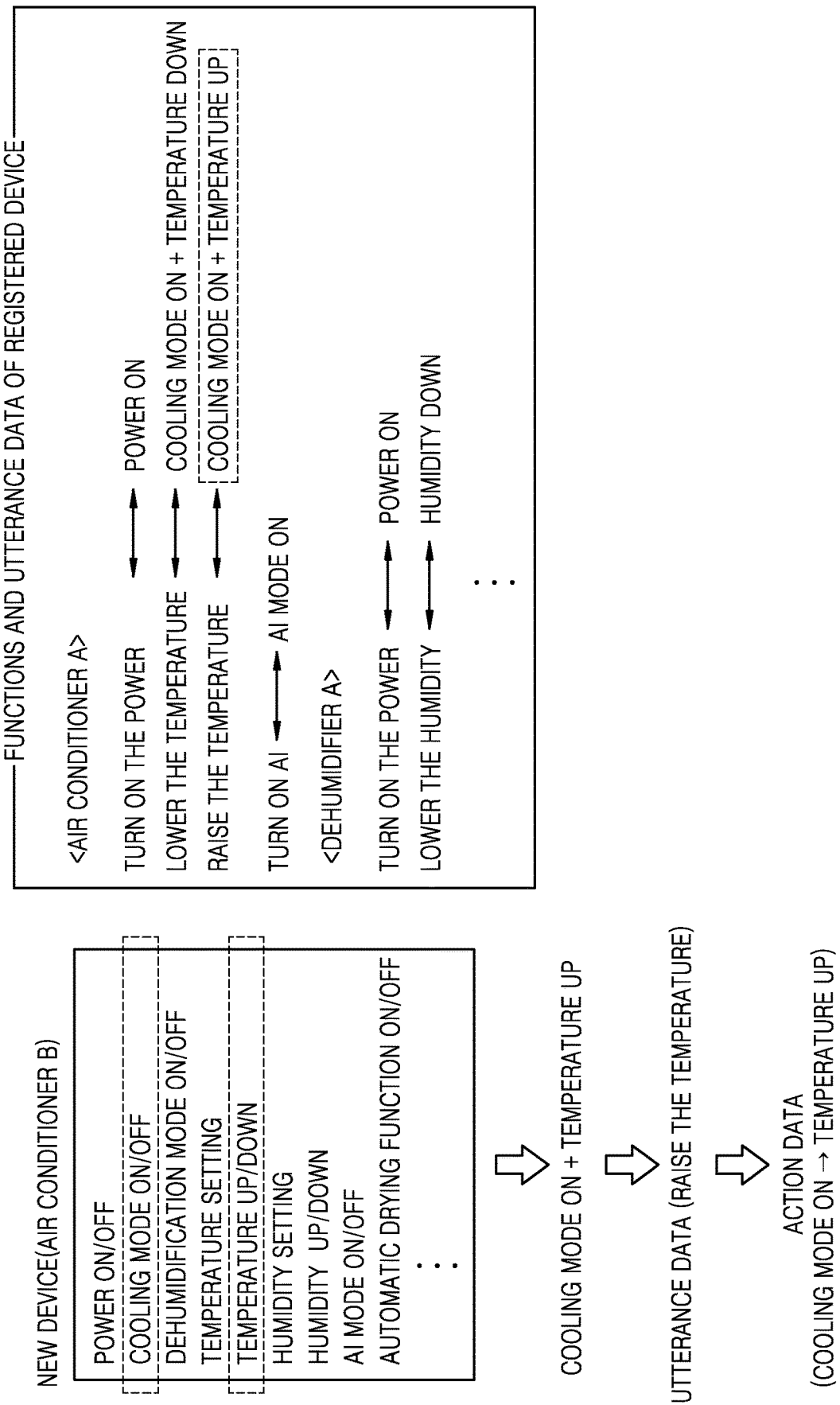

FIG. 5C
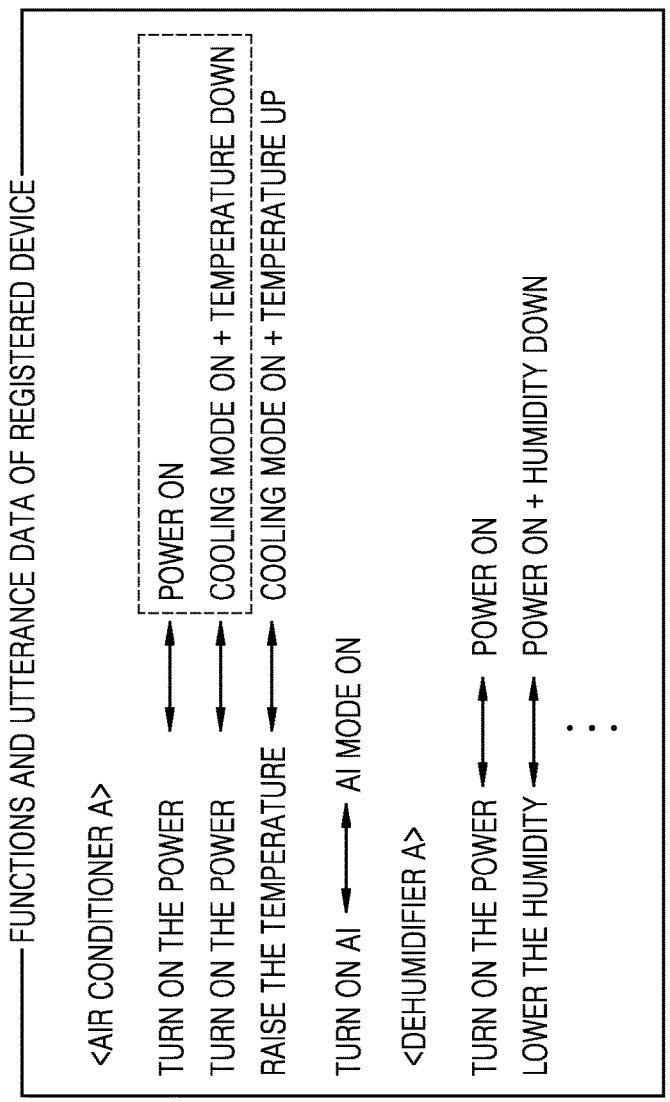
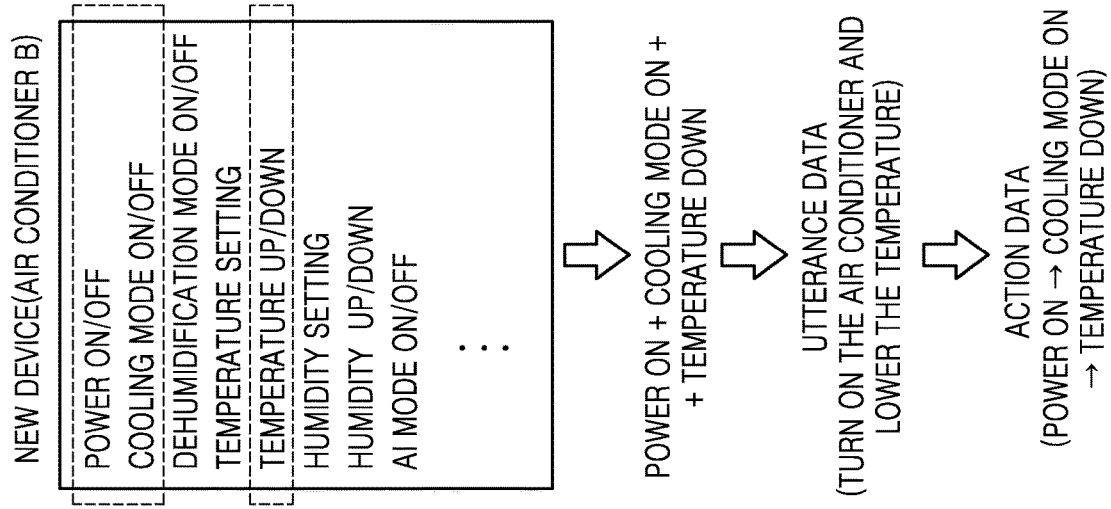

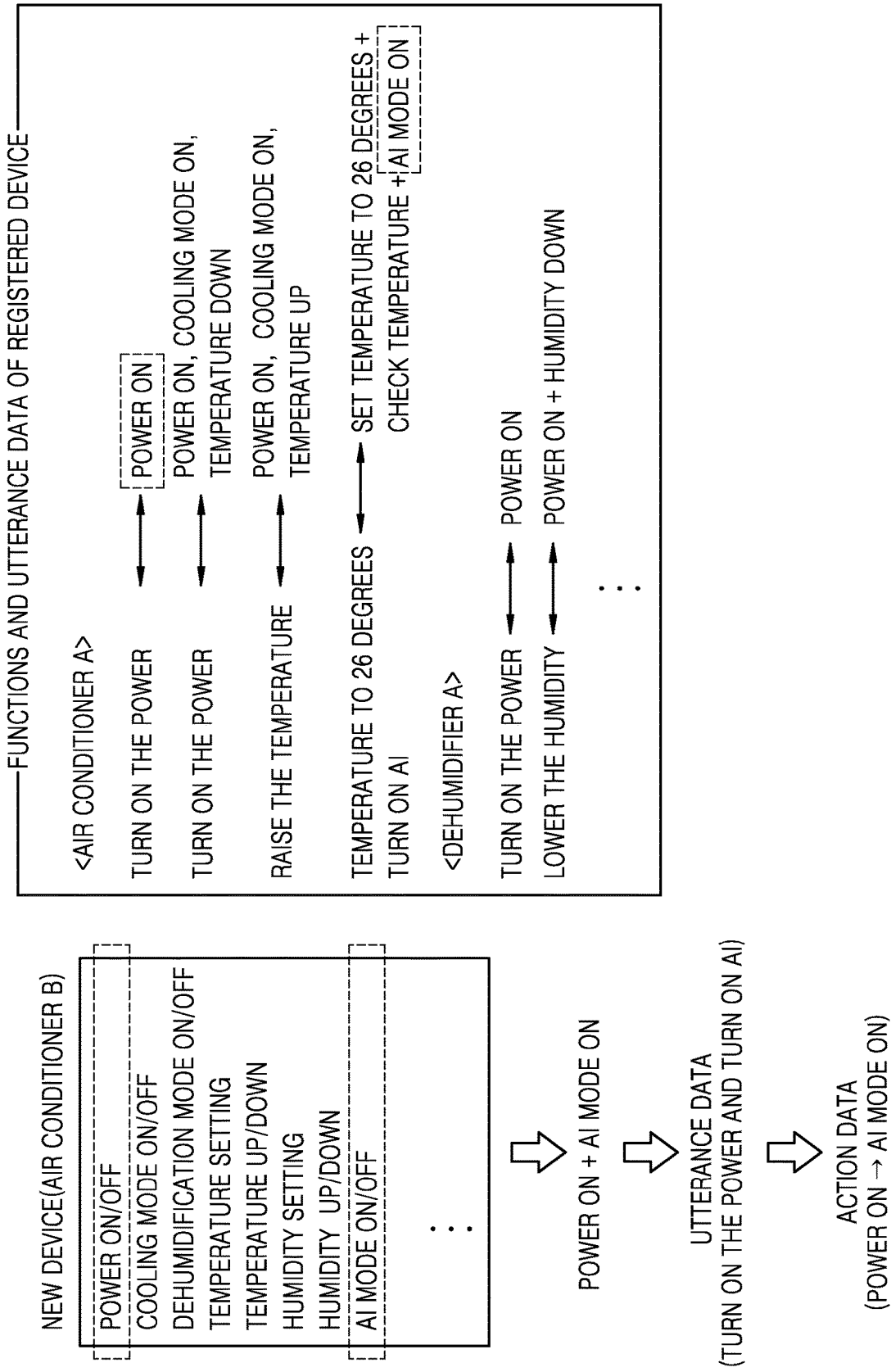

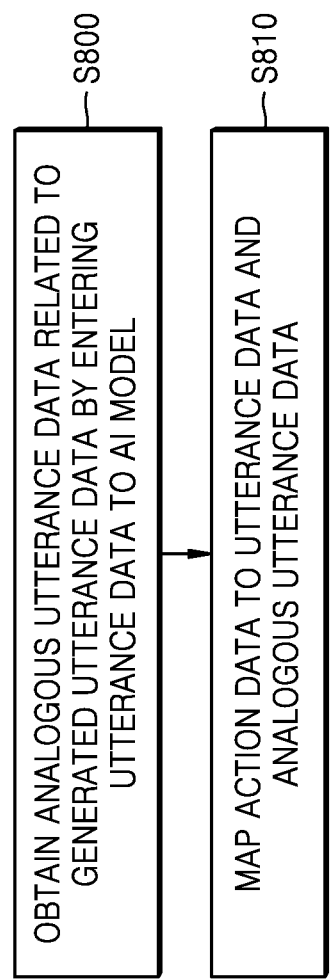

EXECUTE A DRYING FUNCTION WHEN TURNING OFF THE AIR CONDITIONER

⇨ AI MODEL ⇨

PERFORM THE DRYING FUNCTION WHEN YOU TURN OFF THE AIR CONDITIONER
DEODORIZE WHEN YOU TURN OFF THE AIR CONDITIONER
DEODORIZE AFTER TURNING OFF THE AIR CONDITIONER
. . .

FIG. 12

| ID | FUNCTION | FACTOR |
|---|---|---|
| ID_1 | Turn _ | [On/OFF] |
| ID_2 | Set volume | [0-10] |
| ID_3 | Set direction | [0-360, left, right..] |

# SYSTEM AND METHOD FOR REGISTERING DEVICE FOR VOICE ASSISTANT SERVICE

CROSS-REFERENCE TO RELATED APPLICATIONS

This application is a Continuation Application of U.S. application Ser. No. 16/942,251 filed on Jul. 29, 2020, which is based on and claims the benefit of U.S. Provisional Patent Application No. 62/879,638, filed on Jul. 29, 2019, in the United States Patent and Trademark Office, and claims priority under 35 U.S.C. § 119 to Korean Patent Application No. 10-2019-0125679, filed on Oct. 10, 2019, in the Korean Intellectual Property Office, the disclosures of which are herein incorporated by reference in their entireties.

BACKGROUND

1. Field

The disclosure relates to a system and method for registering a new device for a voice assistant service.

2. Description of the Related Art

With the development of multimedia and network technologies, users have been offered various services through devices. In particular, as voice recognition technologies evolve, a user is able to speak their voice (e.g., utterance) into the voice assisted device and receive a response message in reply to the voice input through a service providing agent.

When a voice assistant service is to understand an intention contained in the voice input from the user, artificial intelligence (AI) technology may be used to decipher the correct intention of the voice input from the user, and rule-based natural language understanding (NLU) may also be used.

However, in providing the voice assistant service, when a new device is added to a home network environment including a plurality of devices, it is difficult to provide device control in response to the voice input of the user by taking into account functions of the new device. In particular, even when the new device is not a device registered beforehand with the voice assistant service, the functions of the new device need to be effectively reflected in the voice assistant service.

SUMMARY

Provided are a system and method for registering a new device using functions of a pre-registered device for the voice assistant service.

In accordance with an aspect of the disclosure, there is provided a system and method for registering a function of new device by combining or deleting functions of at least one pre-registered device.

In accordance with an aspect of the disclosure, there is provided a system and method for registering a new device using utterance data related to functions of a pre-registered device.

In accordance with an aspect of the disclosure, there is provided a system and method for obtaining utterance data and action data related to functions of a new device, using utterance data and action data for a pre-registered device.

In accordance with an aspect of the disclosure, there is provided a system and method for generating and updating a voice assistant model specified to a new device, using utterance data and action data related to functions of the new device.

Additional aspects will be set forth in part in the description which follows and, in part, will be apparent from the description, or may be learned by practice of the presented embodiments of the disclosure.

According to a first aspect of the disclosure, there is provided a method performed by a server of registering a new device for a voice assistant service, including: obtaining a first technical specification indicating first functions of a pre-registered device and a second technical specification indicating second functions of the new device; comparing the first functions of the pre-registered device with the second functions of the new device, based on the first technical specification and the second technical specification; based on the comparing, identifying the first functions of the pre-registered device that match the second functions of the new device as matching functions; obtaining pre-registered utterance data related to the matching functions; generating action data for the new device based on the matching functions and the pre-registered utterance data; and storing the pre-registered utterance data and the action data in association with the new device, wherein the action data comprises data related to a series of detailed operations of the new device corresponding to the pre-registered utterance data.

According to a second aspect of the disclosure, there is provided a server for registering a new device for a voice assistant service, including: a communication interface; a memory storing a program including one or more instructions; and a processor configured to execute the one or more instructions of the program stored in the memory to obtain a first technical specification indicating first functions of a pre-registered device and a second technical specification indicating second functions of the new device, compare the first functions of the pre-registered device with the second functions of the new device based on the first technical specification and the second technical specification, identify the first functions of the pre-registered device that match the second functions of the new device as matching functions, obtain pre-registered utterance data related to the matching functions, generate action data for the new device based on the matching functions and the pre-registered utterance data, and store the pre-registered utterance data and the action data in association with the new device in a database, and wherein the action data comprises data related to a series of detailed operations of the new device corresponding to the pre-registered utterance data.

According to a third aspect of the disclosure, there is provided a computer-readable recording medium having a program thereon for a computer to carry out the method of the first aspect of the disclosure and the operation of the second aspect of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 is a flowchart illustrating a method by which a server compares functions of a pre-registered device with functions of a new device, according to an embodiment of the disclosure;

FIG. 5B illustrates a comparison between a set of functions of a pre-registered device and functions of a new device, according to an embodiment of the disclosure;

FIG. 5C illustrates comparing a combination of a function and a set of functions of a pre-registered device with functions of a new device, according to an embodiment of the disclosure;

FIG. 5E illustrates deleting some of functions of a pre-registered device and comparing the remaining functions with functions of a new device, according to an embodiment of the disclosure;

FIG. 8 is a flowchart illustrating a method by which a voice assistant server expands utterance data, according to an embodiment of the disclosure;

FIG. 12 illustrates specifications of a device, according to another embodiment of the disclosure;

DETAILED DESCRIPTION

Figure 1:
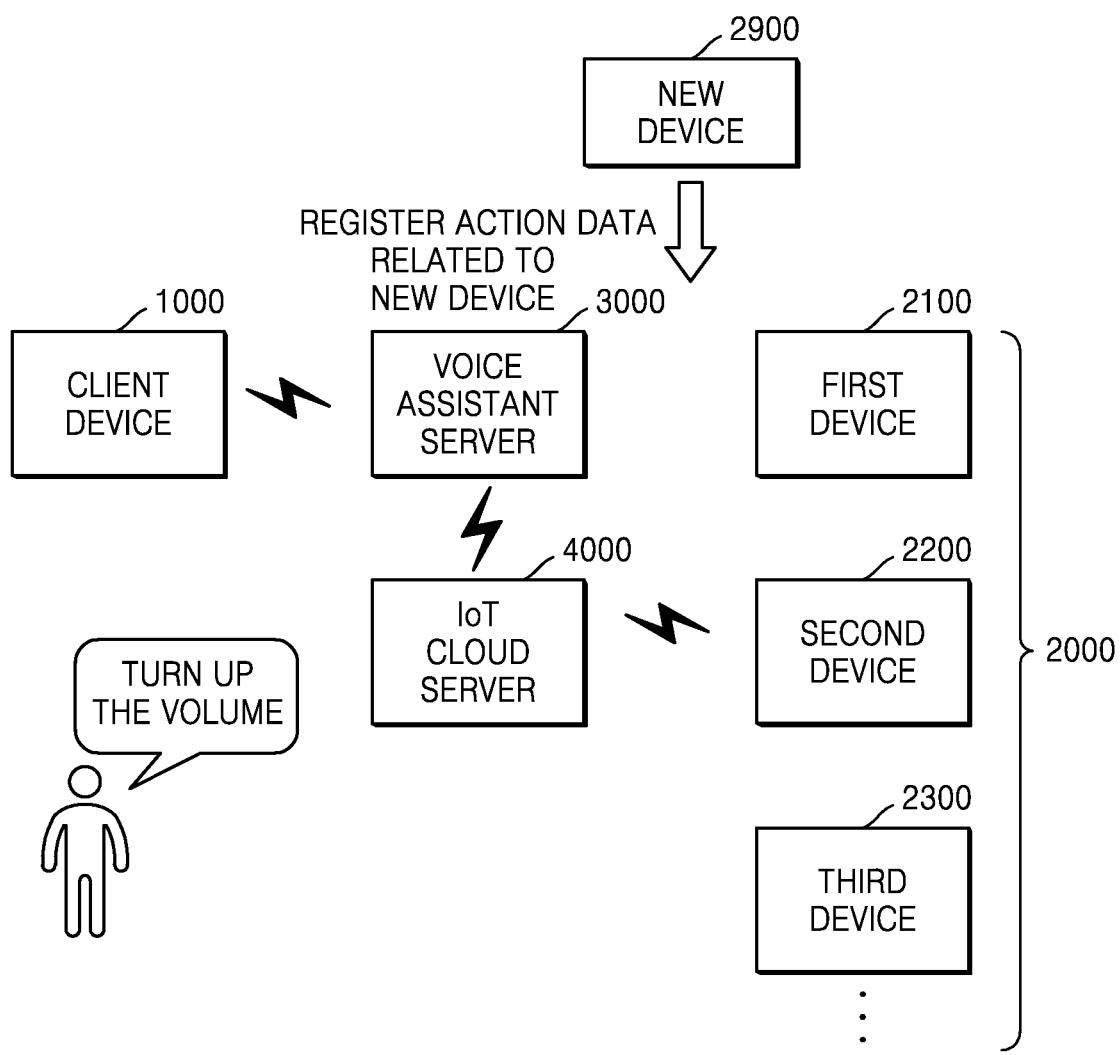
FIG. 1 is a conceptual diagram of a system for providing a voice assistant service, according to an embodiment of the disclosure.

Embodiments of the disclosure will now be described with reference to accompanying drawings. However, the embodiments of the disclosure may be implemented in many different forms, and not limited thereto as will be discussed herein. In the drawings, parts unrelated to the description are omitted for clarity, and like numerals refer to like elements throughout the specification.

When A is said to "be connected" to B, it means to be "directly connected" to B or "electrically connected" to B, and may include C interposed between A and B. The term "include (or including)" or "comprise (or comprising)" is inclusive or open-ended and does not exclude additional, unrecited elements or method steps, unless otherwise mentioned.

Throughout the disclosure, the expression "at least one of a, b or c" indicates only a, only b, only c, both a and b, both a and c, both b and c, all of a, b, and c, or variations thereof.

Functions related to artificial intelligence (AI) according to embodiments of the disclosure are implemented through a processor and a memory storing computer-readable instructions that are executed by the processor. There may be one or more processors. The one or more processors may include a universal processor such as a central processing unit (CPU), an application processor (AP), a digital signal processor (DSP), etc., a dedicated graphic processor such as a graphics processing unit (GP), a vision processing unit (VPU), etc., or a dedicated AI processor such as a neural processing unit (NPU). The one or more processors may control processing of input data according to a predefined operation rule or an AI model stored in the memory. When the one or more processors are the dedicated AI processors, they may be designed in a hardware structure that is specific to dealing with a particular AI model.

The predefined operation rule or the AI model may be made by learning. Specifically, the predefined operation rule or the AI model being made by learning refers to the predefined operation rule or the AI model established to perform a desired feature (or an object) being made when a basic AI model is trained by a learning algorithm by processing training data. Such learning may be performed by a device itself in which AI is performed according to the disclosure, or by a separate server and/or system. Examples of the learning algorithm may include supervised learning, unsupervised learning, semi-supervised learning, or reinforcement learning, without being limited thereto.

The AI model may include a plurality of neural network layers. Each of the plurality of neural network layers may have a plurality of weight values, and perform neural network calculation through operation according to an operation result of the previous layer and the plurality of weight values. The plurality of weight values assigned to the plurality of neural network layers may be optimized by learning results of the AI model. For example, the plurality of weight values may be updated to reduce or minimize a loss value or a cost value obtained by the AI model during a learning procedure. An artificial neural network may include, for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), or a deep Q-network, without being limited thereto.

The disclosure will now be described with reference to accompanying drawings.

FIG. 1 is a conceptual diagram of a system for providing a voice assistant service, according to an embodiment of the disclosure.

Referring to FIG. 1, in an embodiment of the disclosure, a system for providing a voice assistant service may include a client device 1000, at least one additional device 2000, a voice assistant server 3000, and an Internet of Things (IoT) cloud server 4000. The at least one device 2000 may be a device pre-registered in the voice assistant server 3000 or the IoT cloud server 4000 for voice assistant services.

The client device 1000 may receive voice inputs (e.g., utterances) from the user. In an embodiment of the disclosure, the client device 1000 may include a voice recognition module. In an embodiment of the disclosure, the client device 1000 may include a voice recognition module having limited voice processing functionality. For example, the client device 1000 may include a voice recognition module having a function of detecting a designated voice input (e.g., a wakeup input such as 'Hi, Bixby.' 'Okay, Google.' etc.) or a function of preprocessing a voice signal obtained from some voice inputs. The client device 1000 may be an AI speaker, without being limited thereto. In an embodiment of the disclosure, some of the at least one device 2000 may also be implemented as an additional client device 1000.

The at least one device 2000 may be a target controlled device that performs a particular operation in response to a control command from the voice assistant server 3000 and/or the IoT cloud server 4000. The at least one device 2000 may be controlled to perform the particular operation based on a voice input of the user received by the client device 1000. In an embodiment of the disclosure, at least some of the at least one device 2000 may receive a control command from the client device 1000 without receiving any control command from the voice assistant server 3000 and/or the IoT cloud server 4000. Accordingly, the at least one device 2000 may be controlled based on a user voice by one or more of the client device 1000, the voice assistant server 3000, and the IoT cloud server 4000.

The client device 1000 may receive a voice input of the user through a microphone, and forward the voice input to the voice assistant server 3000. In an embodiment of the disclosure, the client device 1000 may obtain a voice signal from the received voice input and forward the voice signal to the voice assistant server 3000.

The voice assistant server 3000 may receive the voice input of the user from the client device 1000, select a target device to perform operations according to an intent of the user from among the at least one device 2000 by interpreting the voice input of the user, and provide information regarding the target device or operations to be performed by the target device to the IoT cloud server 4000 or the target at least one device 2000 that is to be controlled.

The IoT cloud server 4000 may register and manage information about the at least one device 2000 for the voice assistant service, and provide the device information of the at least one device 2000 for the voice assistant service to the voice assistant server 3000. The device information of the at least one device 2000 may be information relating to a device used to provide the voice assistant service, and include e.g., identification (ID) information of a device (a device ID information), capability information, location information, and state information of the device. Furthermore, the IoT cloud server 4000 may receive information about the target device and operations to be performed by the target device from the voice assistant server 3000, and provide control information for controlling the operations of the at least one device 2000 to the target at least one device 2000 that is to be controlled.

When a new device 2900 is added, for example to a home network, for the voice assistant service, the voice assistant server 3000 may generate utterance data and action data for the new device 2900 using functions of the a pre-registered at least one device 2000, utterance data, and operations corresponding to the utterance data. The voice assistant server 3000 may generate or update a voice assistant model to be used for the new device 2900 using utterance data and action data for the new device 2900.

The utterance data is related to voice uttered by the user to acquire a voice assistant service, representing an utterance of the user. The utterance data may be used to interpret an intent of the user related to an operation of the device 2000. The utterance data may include at least one of an utterance sentence in the form of text or an utterance parameter having the form of an output value of a natural language understanding (NLU) model. The utterance parameter may be data output from the NLU model, which may include an intent and a parameter. The intent may be information determined by interpreting text using the NLU model, and may indicate an intent of the user's utterance. For example, the intent may be information indicating a device operation intended by the user or requested by the user to be performed by the at least one device 2000 that is to be controlled. The intent may include the information indicating the intent of the user's utterance (hereinafter, intent information) and a numerical value corresponding to the information indicating the intent of the user. The numerical value may indicate a probability of the text being related to information indicating a particular intent or intention. When there are a plurality of pieces of information indicating the user's intent as a result of interpreting the text using the NLU model, one of the plurality of pieces of intent information having the highest numerical value may be determined as the intent. Furthermore, the parameter may be variable information for determining detailed operations of the device related to the intent. The parameter may be information relating to the intent, and there may be multiple types of parameters corresponding to an intent. The parameter may include the variable information for determining operation information of the device and also a numerical value indicating a probability of the text being related to the variable information. As a result of interpreting the text using the NLU model, a plurality of pieces of variable information indicating the parameter may be obtained. In this case, one of the plurality of pieces of variable information, which has the highest numerical value corresponding to the variable information, may be determined to be the parameter.

The action data may be data related to a series of detailed operations of the at least one device 2000 corresponding to certain utterance data. For example, the action data may include information relating to detailed operations to be performed by the at least one device 2000 corresponding to certain utterance data, correlations between each detailed operation and another detailed operation, and an execution order of the detailed operations. The correlations between a detailed operation and another detailed operation may include information about another detailed operation to be executed before one detailed operation is executed to perform the one detailed operation. For example, when an operation to be performed is "play music," "power on" may be another detailed operation to be executed before the 'play music' operation. The action data may include for example functions to be performed by a target device to perform a particular operation, an execution order of the functions, input values required to perform the functions, and output values output as a result of executing the functions.

When the new device 2900 is identified, the voice assistant server 3000 may obtain function information of the new device 2900, and determine pre-registered utterance data that may be used in relation to a function of the new device 2900 by comparing function information of the pre-registered at least one device 2000 and the function information of the new device 2900. Furthermore, the voice assistant server 3000 may edit pre-registered utterance data and corresponding functions, and generate action data using data related to the edited utterance data and functions.

The at least one device 2000 may include a smart phone, a tablet personal computer (tablet PC), a personal computer (PC), a smart television (smart TV), a personal digital assistant), a laptop, a media player, a micro server, a global positioning system (GPS), an electronic book (e-book) reader, a terminal for digital broadcasting, a navigation, a kiosk, an MP3 player, a digital camera, and mobile or non-mobile computing device, without being limited thereto. Furthermore, the at least one device 2000 may be a home appliance such as a lamp equipped with communication and data processing functions, an air conditioner, a TV, a robot cleaner, a washing machine, a scale, a refrigerator, a set-top box, a home automation control panel, a security control panel, a game console, an electronic key, a camcorder, or an electronic frame. In addition, the at least one device 2000 may be a wearable device, such as a watch, glasses, a hair band, and a ring, each of which has a communication function and a data processing function. It is not, however, limited thereto, and the at least one device 2000 may include any type of device able to transmitting or receiving data from the voice assistant server 3000 and/or the IoT cloud server 4000 over a network, such as a home network, wired or wireless network, or cellular data network.

The network may include a local area network (LAN), a wide area network (WAN), a value added network (VAN), a mobile radio communication network, a satellite communication network, and any combination thereof, which is a comprehensive data communication network allowing the network constituent entities shown in FIG. 1 to perform smooth communication with each other, including the cable Internet, the wireless Internet, and a mobile wireless communication network. The wireless communication may include any of various wireless communication protocols and techniques including wireless LAN (Wi-Fi), Bluetooth, Bluetooth low energy, Zigbee, Wi-Fi Direct (WFD), ultra wideband (UWB), infrared data association (IrDA), near field communication (NFC), etc., without being limited thereto.

Figure 2:
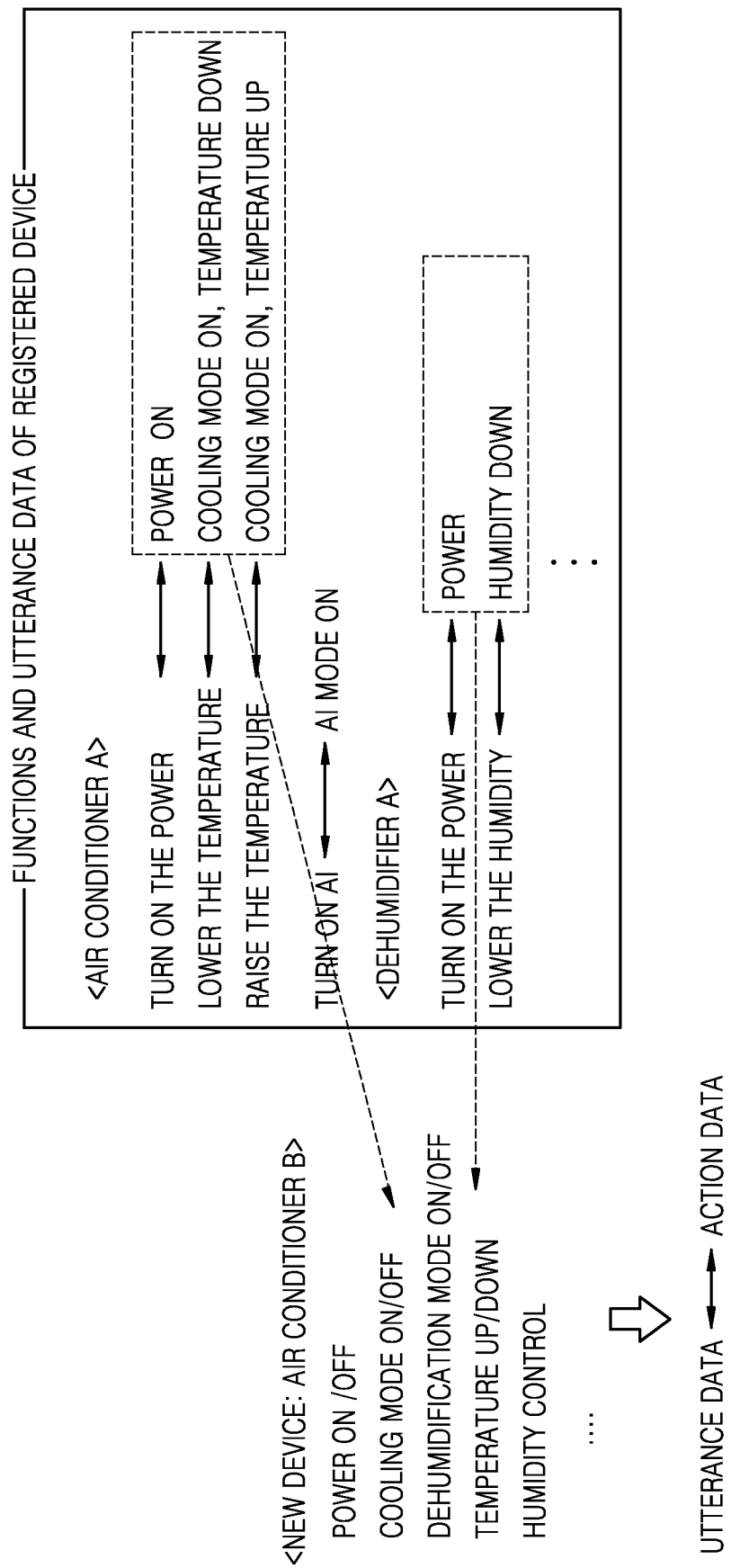
FIG. 2 illustrates a mechanism of a voice assistant server registering a new device based on functions of a pre-registered device, according to an embodiment of the disclosure.

FIG. 2 illustrates a mechanism of a voice assistant server registering a new device based on functions of a pre-registered device, according to an embodiment of the disclosure.

Referring to FIG. 2, when the new device 2900, for example air conditioner B, is identified, the voice assistant server 3000 may obtain functional and operation information of the air conditioner B that indicates the functions of the air conditioner B and the operations of the air conditioner B. Some functions and operations may include a temperature setting, a fan speed setting, an operation schedule, a humidity setting, etc. The voice assistant server 3000 may compare the function information of the air conditioner B with function information of the pre-registered device 2000, an air conditioner A and a dehumidifier A.

The voice assistant server 3000 may compare the functions of the air conditioner B with the functions of the air conditioner A and the functions of the dehumidifier A, and among the functions of the air conditioner B, identify the same or similar functions to the functions of the air conditioner A and the dehumidifier A. For example, the voice assistant server 3000 may identify that "power on/off," "cooling mode on/off," "dehumidifying mode on/off," "temperature up/down," and "humidity control" among the functions of the air conditioner B correspond to the functions of the air conditioner A and the dehumidifier A.

The voice assistant server 3000 may determine utterance data corresponding to at least one of the identified functions, and generate action data corresponding to the determined utterance data. For example, the voice assistant server 3000 may generate or edit utterance data corresponding to at least one of the functions of the air conditioner B using utterance data 'turn on the power' corresponding to "power on" of the air conditioner A, utterance data 'lower the temperature' corresponding to "cooling mode on, temperature down" of the air conditioner A, utterance data 'raise the temperature' corresponding to "cooling mode on, temperature up" of the air conditioner A, utterance data 'turn on the power' corresponding to "power on" of the dehumidifier A, and utterance data 'lower the humidity' corresponding to "humidity down" of the dehumidifier A.

Figure 3:
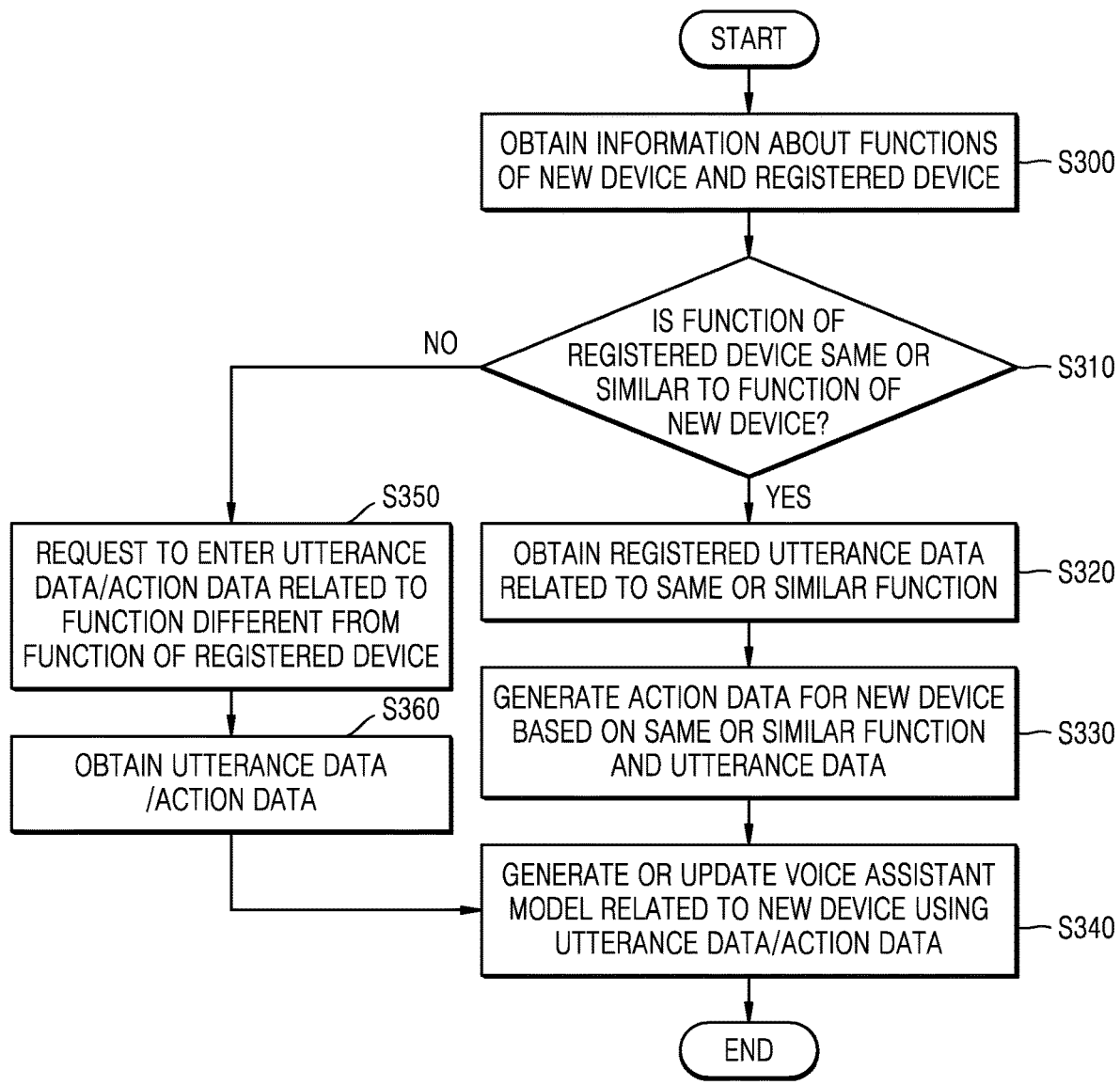
FIG. 3 is a flowchart illustrating a method by which a voice assistant server registers a new device, according to an embodiment of the disclosure.

FIG. 3 is a flowchart illustrating a method of registering a new device, which is performed by the voice assistant server 3000, according to an embodiment of the disclosure. FIG. 12 illustrates specifications of a device, according to an embodiment of the disclosure.

In operation S300, the voice assistant server 3000 obtains function information about functions of the new device 2900 and the pre-registered device 2000. When the new device 2900 is added to a system for voice assistant services, the voice assistant server 3000 may identify functions supported by the new device 2900 from technical specifications of the new device 2900 obtained from the new device 2900 or an external source, such as a manufacturer of the new device 2900 or a database storing technical specifications of devices. For example referring to FIG. 12, the voice assistant server 3000 may identify functions supported by the new device 2900 from the specifications including an identification number, model number, or part number of the device, a title of an executable function, a description about the executable function, and information about a factor required to perform the function.

The voice assistant server 3000 may identify functions of the pre-registered devices 2000 from technical specifications of the devices 2000. The voice assistant server 3000 may identify the functions of the device 2000 from the technical specifications stored in a database (DB) of the voice assistant server 3000. Alternatively, the voice assistant server 3000 may receive the specifications of the device 2000 stored in a database of the IoT cloud server 4000, and identify the functions of the device 2000 from the technical specifications. Like the technical specifications of the new device 2900, the technical specifications of the pre-registered device 2000 may include information about an identification number, model number, or part number of the device, a title of an executable function, a description about the executable function, and information about a factor required to perform the function.

In operation S310, the voice assistant server 3000 may determine whether a function of the new device 2900 is the same as or similar to a function of the pre-registered device 2000. The voice assistant server 3000 may identify any of functions of the new device 2900 identical or similar to a function of the pre-registered device 2000 by comparing functions of the pre-registered device 2000 with functions of the new device 2900.

The voice assistant server 3000 may identify a title indicating a function supported by the new device 2900 from the technical specifications of the new device 2900, and determine whether the identified title is the same or similar to a title of a function supported by the pre-registered device 2000. In this case, the voice assistant server 3000 may store in association information about titles and analogous terms indicating certain functions, and determine based on the stored information about analogous terms whether a function of the pre-registered device 2000 and a function of the new device 2900 are the same or similar to each other.

Furthermore, the voice assistant server 3000 may determine whether the functions are the same or similar to each other by referring to utterance data. The voice assistant server 3000 may determine whether a function of the new device 2900 is the same as or similar to a function of the pre-registered device 2000 using the utterance data related to the function of the pre-registered device 2000. In this case, the voice assistant server 3000 may determine whether the function of the new device 2900 is the same as or similar to the function of the pre-registered device 2000 based on the meanings of words included in the utterance data.

The voice assistant server 3000 may determine whether a single function of the new device 2900 is the same as or similar to a single function of the pre-registered device 2000. The single function may refer to a function such as "power on," "power off," "temperature up," and "temperature down." The voice assistant server 3000 may determine whether a set of functions of the new device 2900 is the same as or similar to a set of functions of the pre-registered device 2000. The set of functions may refer to a set of single functions, e.g., a combination of functions such as "power on+temperature up," "temperature down+humidity down."

When it is determined that the function of the pre-registered device 2000 and the function of the new device 2900 are the same or similar to each other in operation S310, the voice assistant server 3000 may obtain pre-registered utterance data related to the same or similar functions in operation S320.

The voice assistant server 3000 may extract from a database utterance data corresponding to a function determined to be the same as or similar to a function of the new device 2900 among functions of the pre-registered device 2000.

The voice assistant server 3000 may extract from a database utterance data corresponding to a set of functions determined to be the same as or similar to a set of functions of the new device 2900 among sets of functions of the pre-registered device 2000.

In this case, utterance data corresponding to a function of the pre-registered device 2000 and utterance data corresponding to a set of functions of the pre-registered device 2000 may be stored in the database in advance of installation or setup of the new device 2900 to the network.

In the meantime, the voice assistant server 3000 may edit a function and a set of functions determined to be the same or similar and generate utterance data corresponding to the edited functions. The voice assistant server 3000 may combine functions determined to be the same or similar and generate utterance data corresponding to the combined functions. Furthermore, the voice assistant server 3000 may combine a function and a set of functions determined to be the same or similar and generate utterance data corresponding to the combined functions. Moreover, the voice assistant server 3000 may delete some of functions in the set of functions determined to be the same or similar and generate utterance data corresponding to the set of functions from which some functions are deleted.

The voice assistant server 3000 may expand the utterance data. The voice assistant server 3000 may generate analogous utterance data having the same meaning but different expressions from the extracted or generated utterance data by modifying an expression of the extracted or generated utterance data.

In operation S330, the voice assistant server 3000 may generate action data for the new device 2900 based on the same or similar functions and utterance data. The action data may be data indicating detailed operations of the device and an execution order of the detailed operations. The action data may include, for example, identification values of the detailed operations, the execution order of the detailed operations, and a control command to execute the detailed operation, without being limited thereto.

For example, when a function corresponding to the utterance data is a single function, the voice assistant server 3000 may generate action data including a detailed operation representing the single function. In another example, when a function corresponding to the utterance data is a set of functions, the voice assistant server 3000 may generate detailed operations representing the functions in the set and an execution order of the detailed operations.

In operation S340, the voice assistant server 3000 may generate or update a voice assistant model related to the new device 2900 using the utterance data and the action data.

The voice assistant server 3000 may generate or update the voice assistant model related to the new device 2900 using utterance data related to a function of the new device 2900 corresponding to a function of the pre-registered device 2000, utterance data newly generated in relation to the function of the new device 2900, and the expanded utterance data and action data. The voice assistant server 3000 may accumulate and store the utterance data and action data related to the new device 2900. Furthermore, the voice assistant server 3000 may generate or update a concept action network (CAN), which is a capsule type database included in an action plan management model.

The voice assistant model related to the new device 2900 is associated with the new device 2900 as a model to be used for the voice assistant service, which determines an operation to be performed by a target device corresponding to a voice input of the user. The voice assistant model related to the new device 2900 may include e.g., an NLU model, a natural language generation (NLG) model, and an action plan management model. The NLU model related to the new device 2900 is an AI model for interpreting input voice of the user taking into account functions of the new device 2900, and the NLG model related to the new device 2900 is an AI model for generating a natural language for a dialog with the user taking into account the functions of the new device 2900. Furthermore, the action plan management model related to the new device 2900 is a model for planning operation information to be performed by the new device 2900 taking into account the functions of the new device 2900. The action plan management model may select detailed operations to be performed by the new device 2900 and plan an execution order of the selected detailed operations based on the interpreted voice uttered by the user. The action plan management model may obtain operation information about detailed operations to be performed by the new device 2900 using the planning result. The operation information may be information relating to detailed operations to be performed by the device, correlations between the detailed operations, and an execution order of the detailed operations. The operation information may include, e.g., functions to be performed by the new device 2900 to perform the detailed operations, an execution order of the functions, input values required to perform the functions, and output values output as a result of executing the functions.

When the voice assistant model to be used for the new device 2900 already exists, the voice assistant server 3000 may update the voice assistant model.

The voice assistant server 3000 may generate or update the voice assistant model related to the new device 2900 using utterance data related to a function of the new device 2900 corresponding to a function of the pre-registered device 2000, utterance data newly generated in relation to the function of the new device 2900, and the expanded utterance data and action data.

The action plan management model may manage information regarding a plurality of detailed operations and relations between the plurality of detailed operations. A correlation between each of the plurality of detailed operations and another detailed operation may include information about another detailed operation to be executed before one detailed operation is executed to perform the one detailed operation.

In an embodiment of the disclosure, the action plan management model may include a CAN, a capsule type database indicating operations of the device and correlations between the operations. The CAN may include functions to be performed by the device to perform a particular operation, an execution order of the functions, input values required to perform the functions, and output values output as a result of performing the functions, and may be implemented in an ontology graph including knowledge triples indicating concepts and relations between the concepts.

When it is determined that a function of the pre-registered device 2000 and a function of the new device 2900 are not the same or similar to each other in operation S310, the voice assistant server 3000 may make a request for utterance data and action data for a function different from the function of the pre-registered device 2000 in operation S350. The voice assistant server 3000 may register the different function of the new device 2900, and output to the user a query message to generate and edit utterance data related to the different function. The query message may be provided to the user via the client device 1000, the new device 2900, or the developer's device. The voice assistant server 3000 may receive a user's response to the query message from the client device 1000, the new device 2900, or the developer's device. The voice assistant server 3000 may provide a software development kit (SDK) tool for registering a function of the new device 2900 to the client device 1000, the new device 2900, or the developer's device. Furthermore, the voice assistant server 3000 may provide a list of functions different from functions of the pre-registered device 2000 among the functions of the new device 2900 to the user's device 2000 or the developer's device. The voice assistant server 3000 may provide recommended utterance data related to at least some of the different functions to the user's device 2000 or the developer's device.

In operation S360, the voice assistant server 3000 may obtain utterance data and action data. The voice assistant server 3000 may interpret the response to the query using the NLU model. The voice assistant server 3000 may interpret the user's response or the developer's response using the NLU model trained to register a function and generate utterance data. The voice assistant server 3000 may generate utterance data related to functions of the new device 2900 based on the interpreted response. The voice assistant server 3000 may generate utterance data related to the functions of the new device 2900 using the interpreted user's response or the interpreted developer's response, and recommend utterance data. The voice assistant server 3000 may select some of the functions of the new device 2900 and generate utterance data related to each of the selected functions. Furthermore, the voice assistant server 3000 may select some of the functions of the new device 2900 and generate utterance data related to a combination of the selected functions. Moreover, the voice assistant server 3000 may generate analogous utterance data having the same meaning but different expressions from the generated utterance data. The voice assistant server 3000 may generate action data using the generated utterance data. The voice assistant server 3000 may identify functions of the new device 2900 related to the generated utterance data, and determine an execution order of the identified functions to generate action data corresponding to the generated utterance data.

FIG. 4 is a flowchart illustrating a method of comparing functions of a pre-registered device with functions of a new device, which is performed by a server, according to an embodiment of the disclosure.

In operation S400, the voice assistant server 3000 may compare functions of the pre-registered device 2000 with functions of the new device 2900. The voice assistant server 3000 may compare titles of functions supported by the new device 2900 with titles of functions supported by the pre-registered device 2000. In this case, the voice assistant server 3000 may store information about titles and analogous terms indicating certain functions, and compare the function of the pre-registered device 2000 and the function of the new device 2900 based on the stored information about analogous terms.

Furthermore, the voice assistant server 3000 may refer to utterance data stored in the IoT cloud server 4000 to compare functions of the pre-registered device 2000 and functions of the new device 2900. The voice assistant server 3000 may determine whether a function of the new device 2900 is the same as or similar to a function of the pre-registered device 2000 using the utterance data related to the function of the pre-registered device 2000. In this case, the voice assistant server 3000 may determine whether the function of the new device 2900 is the same as or similar to the function of the pre-registered device 2000 based on the meanings of words included in the utterance data.

In operation S405, the voice assistant server 3000 may determine whether there exists any of the functions of the new device 2900 which do not correspond to the function of the pre-registered device 2900. The voice assistant server 3000 may determine whether all functions of the new device 2900 correspond to at least one function of the pre-registered device 2000. For example, the voice assistant server 3000 may identify functions that correspond to the functions of the new device 2900 among functions of a first device 2100, functions of a second device 2200, and functions of a third device 2300.

When a title of a function of the new device 2900 is the same as a title of a function of the pre-registered device 2000, the voice assistant server 3000 may determine that the function of the pre-registered device 2000 corresponds to the function of the new device 2900.

Furthermore, when it is determined that a title of a function of the new device 2900 is similar to a title of a function of the pre-registered device 2000, and that the function of the pre-registered device 2000 and the function of the new device 2900 has the same effect of controlling the devices, the voice assistant server 3000 may determine that the function of the pre-registered device 2000 corresponds to the function of the new device 2900.

In operation S405, when it is determined that the functions of the new device 2900 correspond to a function of the pre-registered device 2000, the voice assistant server 3000 may perform operations S320 to S340. The voice assistant server 3000 may generate utterance data and action data related to a function of the new device 2900 using utterance data and action data related to a function of the pre-registered device 2000 that corresponds to the function of the new device 2900, and generate or update a voice assistant model for providing a voice assistant service related to the new device 2900.

In operation S405, when it is determined that at least one function of the new device 2900 which does not correspond to a function of the pre-registered device 2000, the voice assistant server 3000 may combine functions of the pre-registered device 2000 in operation S410.

The voice assistant server 3000 may combine single functions of the at least one device 2000. For example, the voice assistant server 3000 may combine a first function of the first device 2100 and a second function of the first device 2100. In another example, the voice assistant server 3000 may combine the first function of the first device 2100 and a third function of the second device 2200.

The voice assistant server 3000 may combine a set of functions of the at least one device 2000. For example, the voice assistant server 3000 may combine a first set of functions of the first device 2100 and a second set of functions of the first device 2100. In another example, the voice assistant server 3000 may combine the first set of functions of the first device 2100 and a third set of functions of the second device 2200.

The voice assistant server 3000 may combine a single function and a set of functions of the at least one device 2000. For example, the voice assistant server 3000 may combine the first function of the first device 2100 and the first set of functions of the first device 2100. In another example, the voice assistant server 3000 may combine the first function of the first device 2100 and the third set of functions of the second device 2200.

The voice assistant server 3000 may combine functions of the pre-registered device 2000 from utterance data corresponding to the functions of the pre-registered device 2000. For example, the voice assistant server 3000 may extract first utterance data corresponding to the first function and second utterance data corresponding to the second function of the first device 2100 from a database, and determine to combine the first and second functions based on the meanings of the first utterance data and the second utterance data. In another example, the voice assistant server 3000 may extract first utterance data corresponding to the first function of the first device 2100 and third utterance data corresponding to the third function of the second device 2200 from a database, and determine to combine the first and third functions based on the meanings of the first utterance data and the third utterance data.

In operation S415, the voice assistant server 3000 may compare the combined functions with the functions of the new device 2900. The voice assistant server 3000 may compare titles of the combined functions with titles of functions supported by the pre-registered device 2000. Furthermore, the voice assistant server 3000 may refer to utterance data stored in the IoT cloud server 4000 to compare the combined functions with functions of the new device 2900.

In operation S420, the voice assistant server 3000 may determine whether any function of the new device 2900 does not correspond to a function of the pre-registered device 2900. When the titles of the combined functions are the same as the titles of the functions of the pre-registered device 2000, the voice assistant server 3000 may determine that the combined functions correspond to functions of the new device 2900.

When it is determined that the titles of the combined functions are similar to the titles of the functions of the pre-registered device 2000 and that the combined functions and the functions of the new device 2900 have the same purpose, the voice assistant server 3000 may determine that the combined functions correspond to the functions of the new device 2900.

In operation S420, when it is determined that the functions of the new device 2900 correspond to functions of the pre-registered device 2000, the voice assistant server 3000 may perform operations S320 to S340. The voice assistant server 3000 may generate utterance data and action data related to functions of the new device 2900 using utterance data and action data related to a function of the pre-registered device 2000 that corresponds to the function of the new device 2900 and utterance data and action data related to the combined functions, and generate or update a voice assistant model for providing a voice assistant service related to the new device 2900.

In operation S420, when it is determined the functions of the new device 2900 correspond to functions of the pre-registered device 2000, the voice assistant server 3000 may delete some of the functions of the device 2000.

The voice assistant server 3000 may delete some of single functions of at least one device 2000. The voice assistant server 3000 may delete any of the single functions of the device 2000 determined to be unsupported by the new device 2900.

The voice assistant server 3000 may delete some of a set of functions of at least one device 2000. The voice assistant server 3000 may delete any of the set of functions of the device 2000 determined not to be unsupported by the new device 2900.

The voice assistant server 3000 may delete some of sets of functions of at least one device 2000. The voice assistant server 3000 may delete any of the sets of functions of the device 2000 determined to be unsupported by the new device 2900.

In operation S430, the voice assistant server 3000 may compare functions of the device 2000 remaining after the deletion with the functions of the new device 2900. The voice assistant server 3000 may compare titles of the remaining functions after the deletion with titles of functions supported by the pre-registered device 2000. Furthermore, the voice assistant server 3000 may refer to utterance data stored in the IoT cloud server 4000 to compare the remaining functions after the deletion with the functions of the new device 2900.

In operation S435, the voice assistant server 3000 may determine whether any function of the new device 2900 does not correspond to a function of the pre-registered device 2900. When titles of the remaining functions after the deletion are the same as the titles of the functions of the pre-registered device 2000, the voice assistant server 3000 may determine that the remaining functions of the device 2000 after the deletion correspond to functions of the new device 2900.

Furthermore, when it is determined that the titles of the remaining functions after the deletion are similar to the titles of the functions of the pre-registered device 2000 and that the remaining functions after the deletion and the functions of the new device 2900 have the same purpose, the voice assistant server 3000 may determine that the remaining functions after the deletion correspond to the functions of the new device 2900.

In operation S435, when it is determined that the functions of the new device 2900 correspond to functions of the pre-registered device 2000, the voice assistant server 3000 may perform operations S320 to S340. The voice assistant server 3000 may generate utterance data and action data related to functions of the new device 2900 using utterance data and action data related to a function of the pre-registered device 2000 that correspond to the function of the new device 2900, utterance data and action data related to the combined functions, and utterance data and action data related to the remaining functions after the deletion, and generate or update a voice assistant model for providing a voice assistant service related to the new device 2900.

In operation S435, when it is determined that any function of the new device 2900 does not correspond to a function of the pre-registered device 2000, the voice assistant server 3000 may perform operation S350.

Although operations S400, S410, S415, S425, and S430 are shown as being sequentially performed in FIG. 4, the order is not limited thereto. For example, before a function of the new device 2900 is compared with a function of the pre-registered device 2000 as in operation S400, functions of the pre-registered device 2000 may be combined as in operation S410 or some of the functions are deleted as in S425 to build a database. In this case, using the database, a function of the new device 2900 may be compared with a function of the pre-registered device 2000, combined functions of the pre-registered device 2000, and remaining functions after the deletion in operations S400, S415, and S430, and it may be determined whether any function of the new device 2900 does not correspond to a function of the pre-registered device 2000.

Figure 5A:
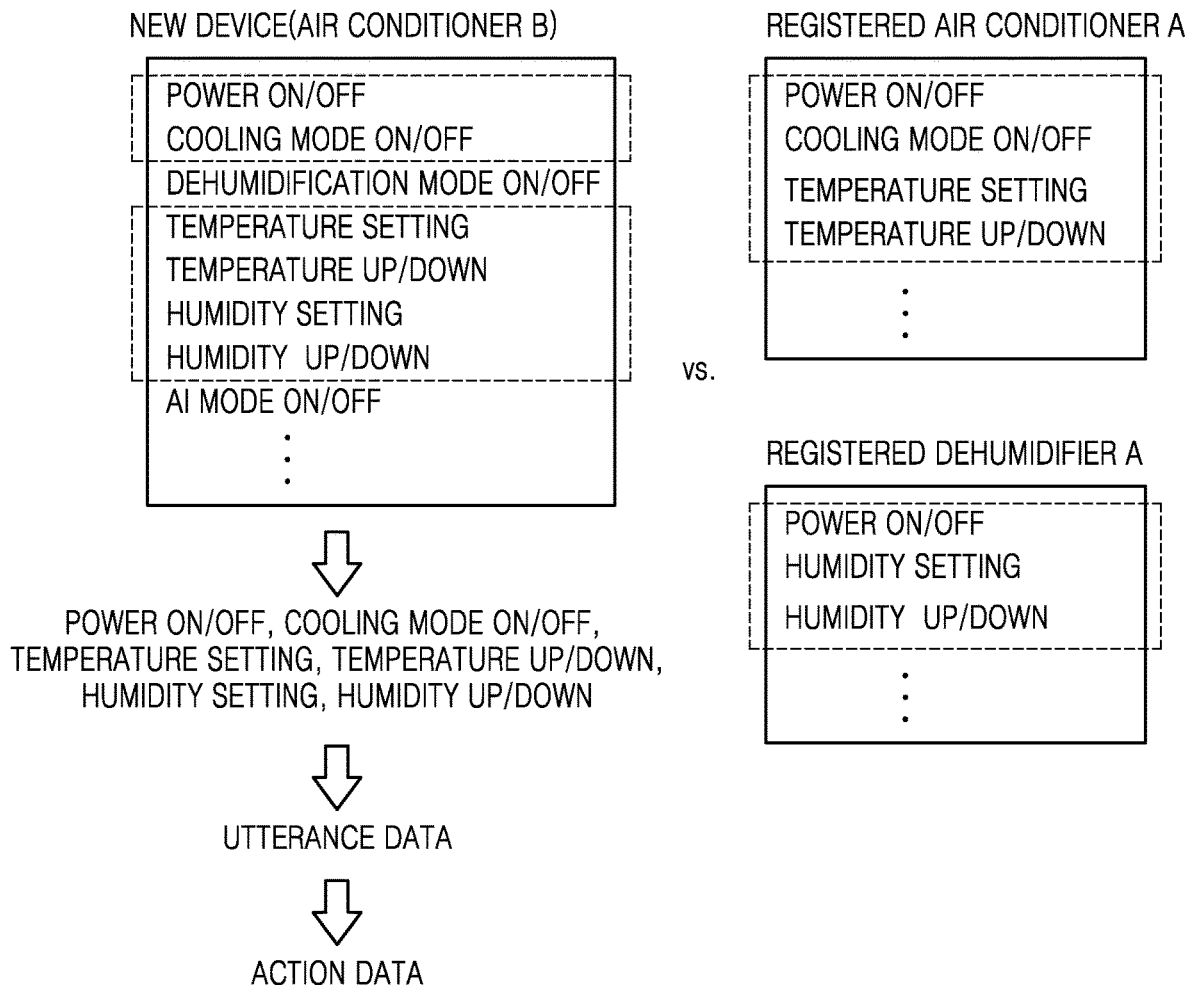
FIG. 5A illustrates a comparison between functions of a pre-registered device and functions of a new device, according to an embodiment of the disclosure.

FIG. 5A illustrates comparison between functions of a pre-registered device and functions of a new device, according to an embodiment of the disclosure.

Referring to FIG. 5A, the voice assistant server 3000 may compare functions of the pre-registered air conditioner A, functions of the pre-registered dehumidifier A, and functions of the new air conditioner B.

For example, functions supported by the new air conditioner B may include power on/off, cooling mode on/off, dehumidification mode on/off, temperature setting, temperature up/down, humidity setting, humidity up/down, AI mode on/off, etc. Furthermore, for example, functions supported by the pre-registered air conditioner A may include power on/off, cooling mode on/off, temperature setting, temperature up/down, etc. Furthermore, for example, functions supported by the pre-registered dehumidifier A may include power on/off, humidity setting, humidity up/down, etc.

The voice assistant server 3000 may determine that "power on/off," "cooling mode on/off," "temperature setting," "temperature up/down," "humidity setting," and "humidity up/down" among the functions of the new air conditioner B correspond to the functions of the air conditioner A and the dehumidifier A. The voice assistant server 3000 may use utterance data related to the functions of the air conditioner A and utterance data related to the functions of the dehumidifier A to determine whether the functions correspond to each other.

The voice assistant server 3000 may obtain utterance data corresponding to each of the functions provided by the pre-registered air conditioner A, "power on/off," "cooling mode on/off," "temperature setting," and "temperature up/down," and obtain utterance data corresponding to each of the functions provided by the pre-registered dehumidifier A, "power on/off," "humidity setting," and "humidity up/down." Furthermore, the voice assistant server 3000 may generate action data of the new air conditioner B using the matched functions and obtained utterance data.

FIG. 5B illustrates comparison between a set of functions of a pre-registered device and functions of a new device, according to an embodiment of the disclosure.

Referring to FIG. 5B, the voice assistant server 3000 may identify that a set of functions of the pre-registered air conditioner A, "cooling mode on+temperature up" matches "cooling mode on/off" and "temperature up/down" of the new air conditioner B.

The voice assistant server 3000 may obtain utterance data 'raise the temperature' corresponding to the set of functions of the pre-registered air conditioner A "cooling mode on+temperature up." Furthermore, the voice assistant server 3000 may use the functions of the new air conditioner B "cooling mode on/off" and "temperature up/down" and the obtained utterance data 'raise the temperature' to generate action data for executing the function of "cooling mode on" followed by the function of "temperature up."

FIG. 5C illustrates comparing a combination of a function and a set of functions of a pre-registered device with functions of a new device, according to an embodiment of the disclosure.

Referring to FIG. 5C, the voice assistant server 3000 may identify that a combination of a function "power on" of the pre-registered air conditioner A and a set of functions of the pre-registered air conditioner A, "cooling mode on+temperature down" matches "power on/off," "cooling mode on/off" and "temperature up/down" of the new air conditioner B.

The voice assistant server 3000 may obtain utterance data 'turn on the power' corresponding to the function "power on" of the pre-registered air conditioner A, and utterance data 'lower the temperature' corresponding to the set of functions of the pre-registered air conditioner A "cooling mode on+temperature down." Furthermore, the voice assistant server 3000 may edit the obtained utterance data. For example, the voice assistant server 3000 may generate utterance data representing 'turn on the air conditioner' and 'lower the temperature' from the utterance data 'turn on the power' and 'lower the temperature.'

Furthermore, the voice assistant server 3000 may use the functions of the new air conditioner B "power on/off," "cooling mode on/off" and "temperature up/down" and the generated utterance data 'turn on the air conditioner and lower the temperature' to execute the function "power on"

followed by the function "cooling mode on" followed by the function of "temperature down."

Figure 5D:
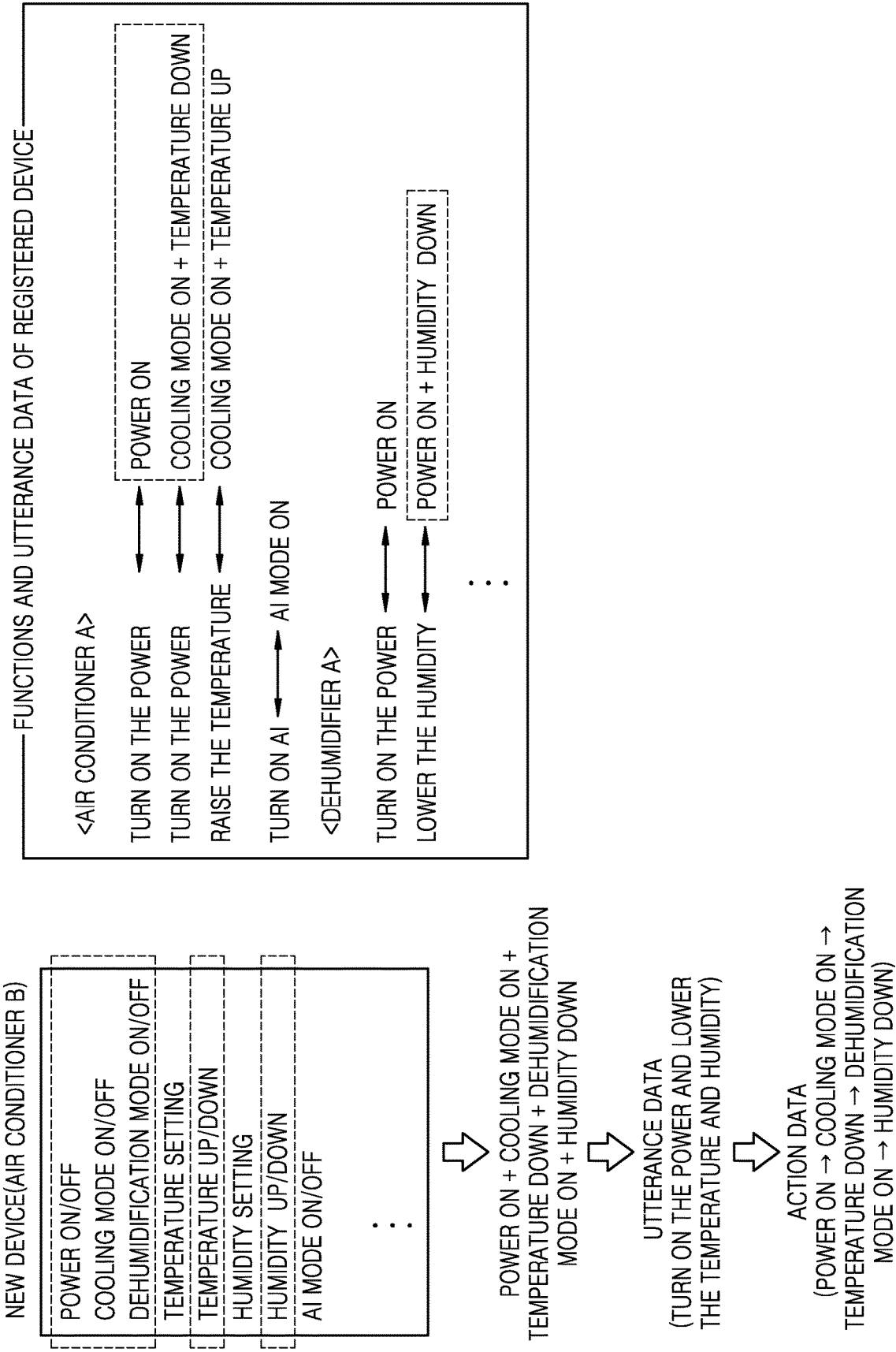
FIG. 5D illustrates comparing a combination of functions and a set of functions of a plurality of pre-registered devices with functions of a new device, according to an embodiment of the disclosure.

FIG. 5D illustrates comparing a combination of functions and sets of functions of a plurality of pre-registered devices with functions of a new device, according to an embodiment of the disclosure.

Referring to FIG. 5D, the voice assistant server 3000 may identify that a combination of i) a function "power on" of the pre-registered air conditioner A, ii) a set of functions of the pre-registered air conditioner A, "cooling mode on+temperature down," and iii) a set of functions of the dehumidifier A, "power on+humidity down" matches "power on/off," "cooling mode on/off," "temperature up/down," and "humidity up/down" of the new air conditioner B.

The voice assistant server 3000 may obtain i) utterance data 'turn on the power' corresponding to the function "power on" of the pre-registered air conditioner A, ii) utterance data 'lower the temperature' corresponding to the set of functions of the pre-registered air conditioner A "cooling mode on+temperature down," and iii) utterance data 'lower the humidity' corresponding to the set of functions of the pre-registered dehumidifier A "power on+humidity down." Furthermore, the voice assistant server 3000 may edit the obtained utterance data. For example, the voice assistant server 3000 may generate utterance data representing 'turn on the air conditioner and lower the temperature and humidity' from the utterance data 'turn on the power.' 'lower the temperature.' and 'lower the humidity.'

Furthermore, the voice assistant server 3000 may use the functions of the new air conditioner B "power on/off," "cooling mode on/off," "temperature up/down," "dehumidification mode on/off," and "humidity up/down" and the generated utterance data 'turn on the air conditioner and lower the temperature and humidity' to execute the function "power on" followed by the functions "cooling mode on," "temperature down," "dehumidification mode on" and "humidity down" in the particular order.

FIG. 5E illustrates deleting some of functions of a pre-registered device and comparing the remaining functions with functions of a new device, according to an embodiment of the disclosure.

Referring to FIG. 5E, the voice assistant server 3000 may delete "set temperature to 26 degrees+check temperature" from a set of functions of the pre-registered air conditioner A "set temperature to 26 degrees+check temperature+AI mode on," and obtain the remaining function "AI mode on." Furthermore, the voice assistant server 3000 may identify that a combination of i) the remaining function "AI mode on" and ii) the function "power on" of the pre-registered air conditioner A matches "power on/off" and "AI mode on/off" of the new air conditioner B.

The voice assistant server 3000 may obtain utterance data 'turn on the power' corresponding to the function of the pre-registered air conditioner A "power on." Furthermore, the voice assistant server 3000 may extract utterance data 'turn on the AI function' corresponding to the remaining function "AI mode on" from utterance data 'turn on the AI function at temperature 26 degrees' corresponding to a set of functions of the pre-registered air conditioner A "set temperature to 26 degrees+check temperature+AI mode on." Moreover, the voice assistant server 3000 may generate utterance data representing 'turn on the power and then AI function' from 'turn on the power' and 'turn on the AI function.'

Furthermore, the voice assistant server 3000 may use the functions of the new air conditioner B "power on/off" and "AI mode on/off" and the generated utterance data 'turn on the power and then AI function' to generate action data for executing the function of "power on" followed by the function of "AI mode on."

Figure 6:
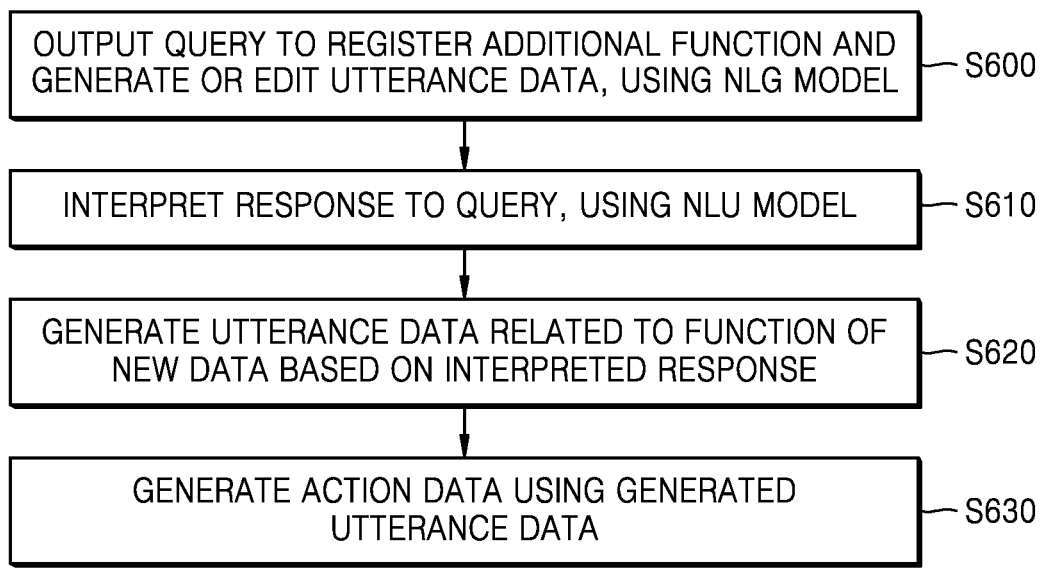
FIG. 6 is a flowchart illustrating a method by which a voice assistant server generates utterance data and action data related to functions different from functions of a pre-registered device among functions of a new device, according to an embodiment of the disclosure.

FIG. 6 is a flowchart illustrating a method of generating utterance data and action data related to functions different from functions of a pre-registered device among functions of a new device, which is performed by a voice assistant server, according to an embodiment of the disclosure.

In operation S600, the voice assistant server 3000 uses an NLG model to output a query for registering an additional function, generating or editing utterance data. The voice assistant server 3000 may provide a graphic user interface (GUI) for registering a function of the new device 2900 and generating utterance data to the user's device 2000 or a developer's device. The developer's device may have a certain SDK installed therein for registering a new device, and receive a GUI from the voice assistant server 3000 through the SDK.

The voice assistant server 3000 may provide guide text or guide voice data to the user for registering a function of the new device 2900 and generating utterance data to the user's device 2000 or the developer's device. The voice assistant server 3000 may generate a query for registering an additional function and generating utterance data using the NLG model trained to register a function and generate utterance data.

Furthermore, the voice assistant server 3000 may provide a list of functions different from functions of the pre-registered device 2000 among the functions of the new device 2900 to the user's device 2000 or the developer's device. The voice assistant server 3000 may provide recommended utterance data related to at least some of the different functions to the user's device 2000 or the developer's device.

In operation S610, the voice assistant server 3000 may interpret a response to the query using the NLU model. The voice assistant server 3000 may receive the user's response to the query from the user's device 2000, or receive the developer's response to the query from the developer's device. The voice assistant server 3000 may interpret the user's response or the developer's response using the NLU model trained to register a function and generate utterance data.

Furthermore, the voice assistant server 3000 may receive from the user's device 2000 the user's response input through a GUI provided for the user's device 2000, or receive the developer's response input through a GUI provided for the developer's device from the developer's device.

In operation 620, the voice assistant server 3000 generates utterance data related to functions of the new device 2900 based on the interpreted response. The voice assistant server 3000 may generate utterance data related to the functions of the new device 2900 using the interpreted user's response or the interpreted developer's response, and recommend the generated utterance data. The voice assistant server 3000 may select some of the functions of the new device 2900 and generate utterance data related to each of the selected functions. Furthermore, the voice assistant server 3000 may select some of the functions of the new device 2900 and generate utterance data related to a combination of the selected functions.

The voice assistant server 3000 may generate utterance data related to a function of the new device 2900 using an NLG model for generating utterance data based on IDs and attributes of the functions of the new device 2900. For example, the voice assistant server 3000 may enter data representing the IDs and attributes of the functions of the new device into the NLG model for generating utterance data and obtain utterance data output from the NLG model, without being limited thereto.

The voice assistant server 3000 may select at least some portions of the utterance data generated based on the user's response input through the GUI and the developer's response input through the GUI. Moreover, the voice assistant server 3000 may generate analogous utterance data having the same meaning but different expressions from the generated utterance data.

In operation S630, the voice assistant server 3000 may generate action data using the generated utterance data. The voice assistant server 3000 may identify functions of the new device 2900 related to the generated utterance data, and determine an execution order of the identified functions to generate action data corresponding to the generated utterance data. The generated action data may match the utterance data and the analogous utterance data FIG. 7A illustrates a query output from a voice assistant server to generate utterance data and action data related to a function of a new device, according to an embodiment of the disclosure.

Figure 7A:
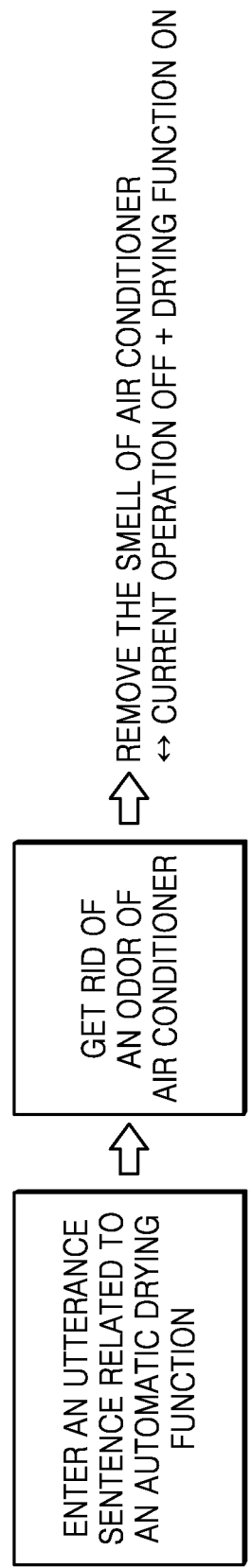
FIG. 7A illustrates a query output from a voice assistant server to generate utterance data and action data related to a function of a new device, according to an embodiment of the disclosure.

Referring to FIG. 7A, the voice assistant server 3000 may provide a query for receiving an utterance sentence related to a new function of the new device 2900, which is an air conditioner, to the user's device 2000 or the developer's device. For example, text or a querying voice 'speak an utterance sentence related to an automatic drying function" may be output from the user's device 2000 or the developer's device.

In another example, the voice assistant server 3000 may receive an utterance sentence 'get rid of an odor of air conditioner' input from the user's device 2000 or the developer's device from the user's device 2000 or the developer's device.

The voice assistant server 3000 may modify 'get rid of an odor of air conditioner' to 'remove the smell of air conditioner.' The voice assistant server 3000 may generate action data "current operation off+drying function on" corresponding to the modified utterance sentence 'remove the smell of air conditioner.'

Figure 7B:
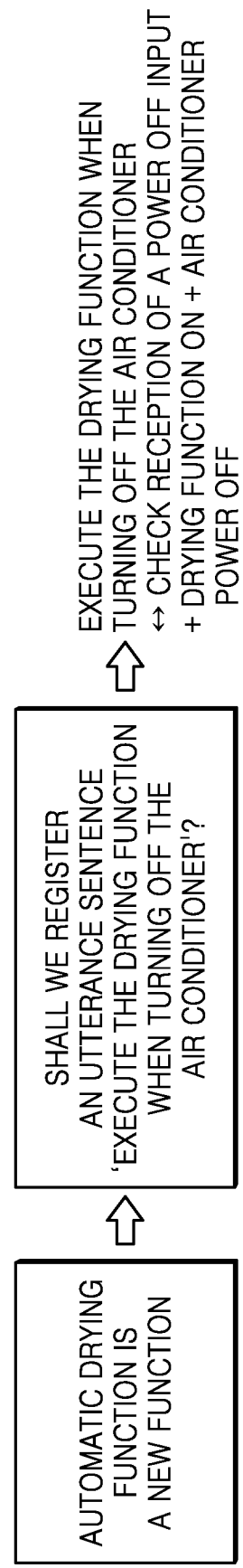
FIG. 7B illustrates a query output to recommend an utterance sentence to generate utterance data and action data related to a function of a new device, according to an embodiment of the disclosure.

FIG. 7B illustrates a query output to recommend an utterance sentence to generate utterance data and action data related to a function of a new device, according to an embodiment of the disclosure.

Referring to FIG. 7B, the voice assistant server 3000 may provide text or a voice for informing a new function of the new device 2900, which is an air conditioner, to the user's device 2000 or the developer's device. For example, the voice assistant server 3000 may allow text or a voice 'automatic drying function is a new function' to be output from the user's device 2000 or the developer's device. Furthermore, the voice assistant server 3000 may generate a recommended utterance sentence related to the new function, i.e., automatic drying function, and provide text or a voice representing the recommended utterance sentence to the user's device 2000, or the developer's device. For example, the voice assistant server 3000 may allow a query "shall we register an utterance sentence 'execute the drying function when turning off the air conditioner?'" to be output from the user's device 2000 or the developer's device.

Furthermore, the voice assistant server 3000 may receive an input of selection of the recommended utterance sentence from the user's device 2000 or the developer's device.

The voice assistant server 3000 may generate action data "check reception of a power off input+drying function on+air conditioner power off" corresponding to the recommended utterance sentence 'execute the drying function when turning off the air conditioner'

FIG. 8 is a flowchart illustrating a method of expanding utterance data, which is performed by the voice assistant server 3000, according to an embodiment of the disclosure.

In operation S800, the voice assistant server 3000 may obtain analogous utterance data related to generated utterance data by entering the generated utterance data to an AI model. The voice assistant server 3000 may obtain the analogous utterance data output from the AI model by entering the generated utterance data to the AI model trained to generate analogous utterance data to utterance data. The AI model may be e.g., a model trained with an utterance sentence and a set of analogous utterance sentences as learning data.

Figure 9A:
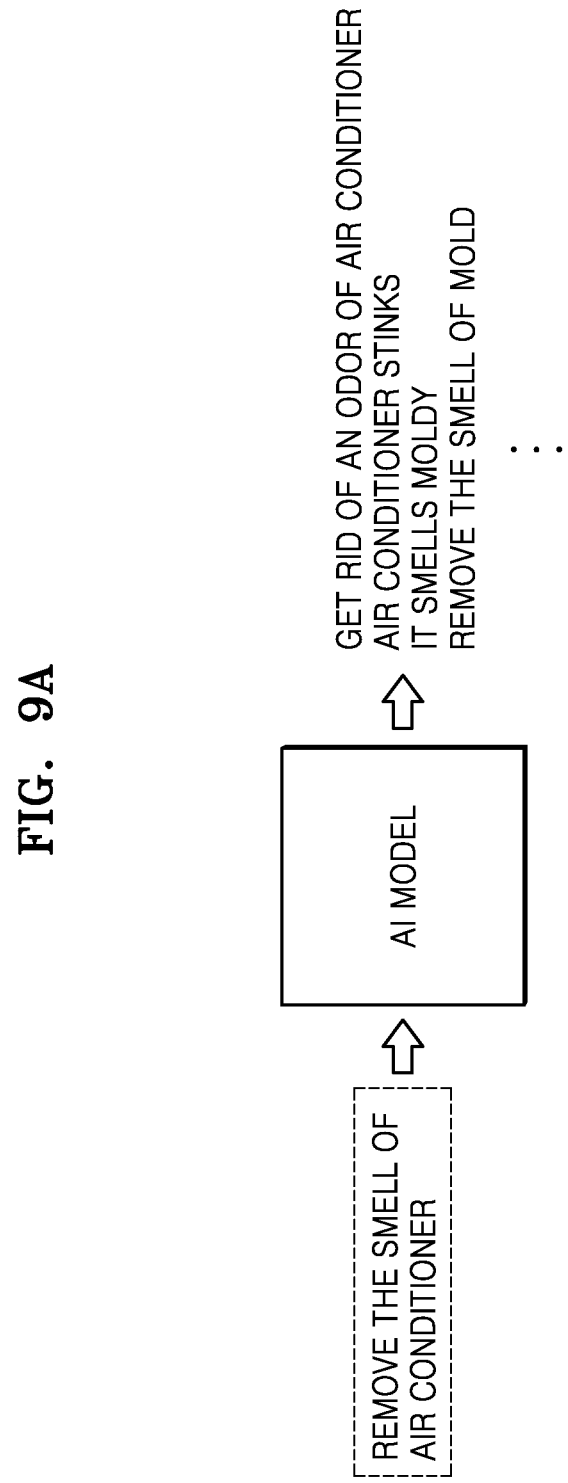
FIG. 9A illustrates generating analogous utterance data from utterance data, according to an embodiment of the disclosure.

For example, as shown in FIG. 9A, when an utterance sentence 'remove the smell of air conditioner' is entered into the AI model, analogous utterance sentences such as 'get rid of an odor of air conditioner.' 'air conditioner stinks.' 'it smells moldy.' 'remove the smell of mold.' etc., may be output from the AI model. The utterance sentence 'remove the smell of air conditioner' entered into the AI model may be set as a representative utterance sentence. The representative utterance sentence may be set taking into account, but not exclusively to, frequency of use by the user, grammar accuracy, etc.

Figure 10A:
FIG. 10A illustrates generating analogous utterance data from utterance data, according to another embodiment of the disclosure.

Furthermore, for example, as shown in FIG. 10A, when an utterance sentence 'execute a drying function when turning off the air conditioner' is entered into the AI model, analogous utterance sentences such as 'perform the drying function when you turn off the air conditioner.' 'deodorize when you turn off the air conditioner.' 'deodorize after turning off the air conditioner.' etc., may be output from the AI model. Moreover, 'execute a drying function when turning off the air conditioner' may be set as the representative utterance sentence. Alternatively, one of the analogous utterance sentences output from the AI model, 'perform the drying function when you turn off the air conditioner' may be set as a representative utterance sentence. The representative utterance sentence may be set taking into account, but not exclusively to, frequency of use by the user, grammar accuracy, etc.

In operation S810, the voice assistant server 3000 may map action data to utterance data and analogous utterance data. The voice assistant server 3000 may map action data corresponding to utterance data entered into the AI model to analogous utterance data output from the AI model.

Figure 9B:
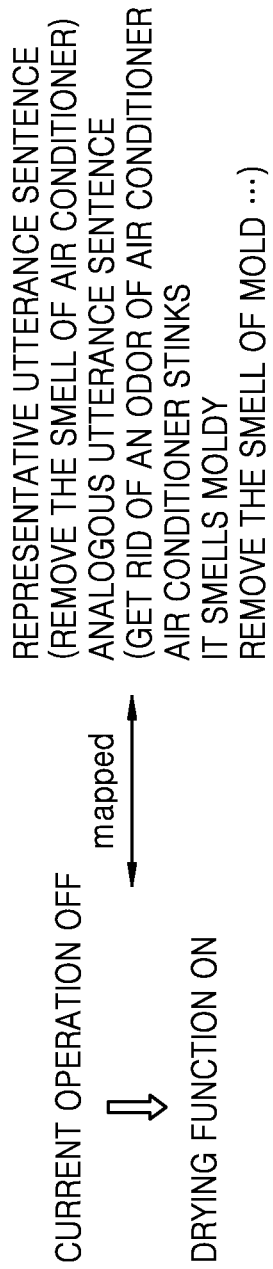
FIG. 9B illustrates a representative utterance sentence and analogous utterance sentences mapped to action data, according to an embodiment of the disclosure.

For example, as shown in FIG. 9B, the representative utterance sentence 'remove the smell of air conditioner.' and the analogous utterance sentences 'get rid of an odor of air conditioner.' 'air conditioner stinks.' 'it smells moldy.' 'remove the smell of mold.' etc., may be mapped to action data "current operation off-->drying function on."

Figure 10B:
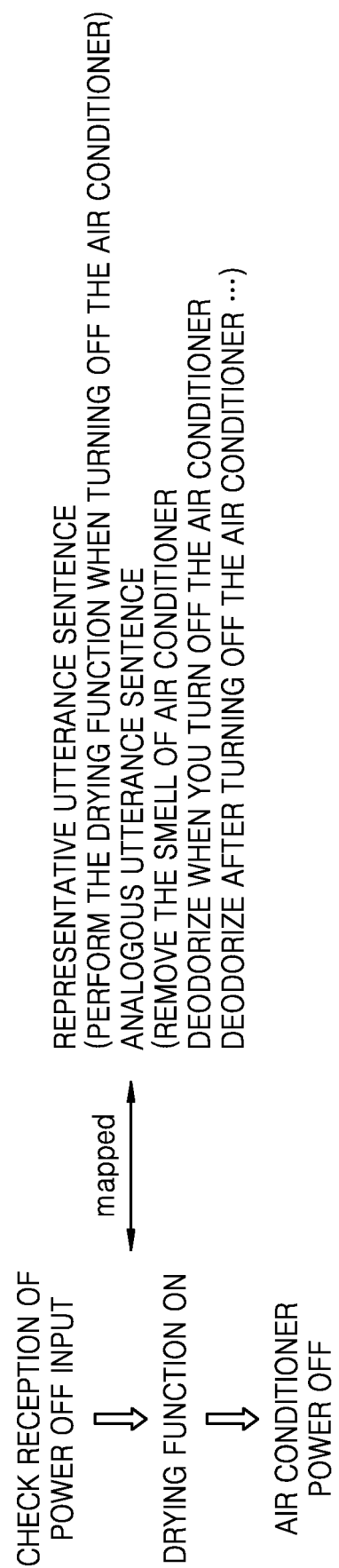
FIG. 10B illustrates a representative utterance sentence and analogous utterance sentences mapped to action data, according to an embodiment of the disclosure.

Furthermore, for example, as shown in FIG. 10B, the representative utterance sentence 'execute a drying function when turning off the air conditioner' and the analogous utterance sentences 'remove the smell of air conditioner.' 'deodorize when you turn off the air conditioner.' and 'deodorize after turning off the air conditioner' may be mapped to action data "check reception of power off input-->drying function on-->air conditioner power off."

Figure 11A:
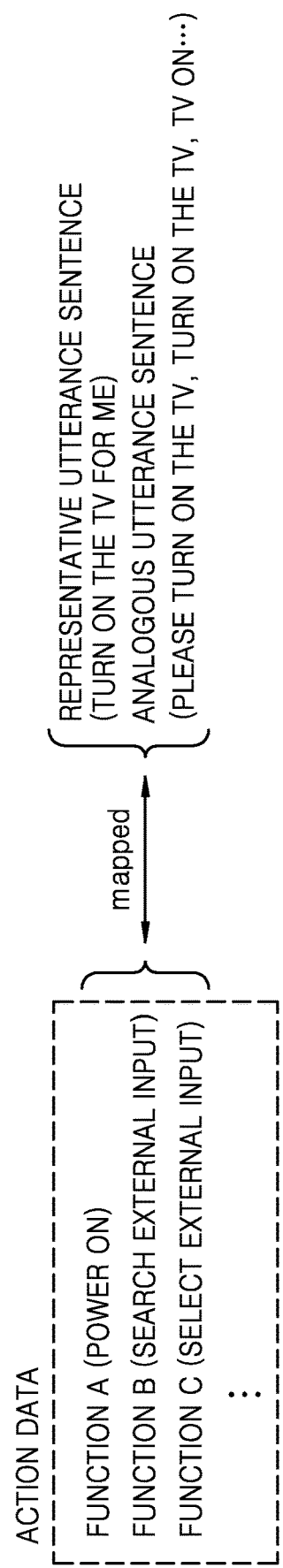
FIG. 11A illustrates utterance data, according to an embodiment of the disclosure.

FIG. 11A illustrates utterance data, according to an embodiment of the disclosure.

Referring to FIG. 11A, utterance data may have a text format. For example, a representative utterance sentence 'turn on the TV for me' and analogous utterance sentences 'please turn on the TV.' 'turn on the TV.' and 'TV on' may be the utterance data.

Figure 11B:
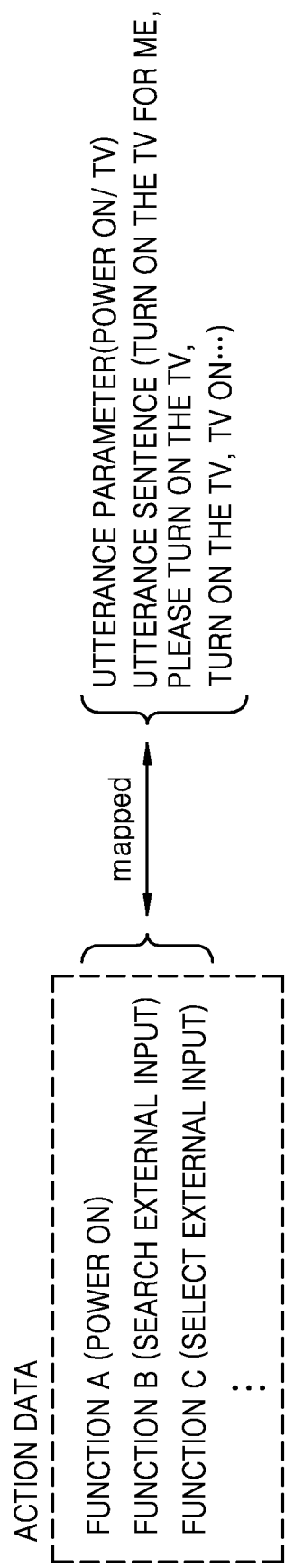
FIG. 11B illustrates utterance data, according to another embodiment of the disclosure.

FIG. 11B illustrates utterance data, according to another embodiment of the disclosure.

Referring to FIG. 11B, utterance data may include an utterance parameter and an utterance sentence. The utterance parameter may be an output value of an NLU model including an intent and a parameter. For example, the utterance parameter included in the utterance data may include the intent (action, function, or command) 'power on' and the parameter (object or device) 'TV.' Furthermore, the utterance sentences included in the utterance data may include text such as "turn on the TV for me.' 'please turn on the TV.' 'turn on the TV.' and 'TV on.' Although the utterance data is shown as including the utterance parameter and the utterance sentence in FIG. 11B, it is not limited thereto and the utterance data may include only utterance parameters.

Figure 13:
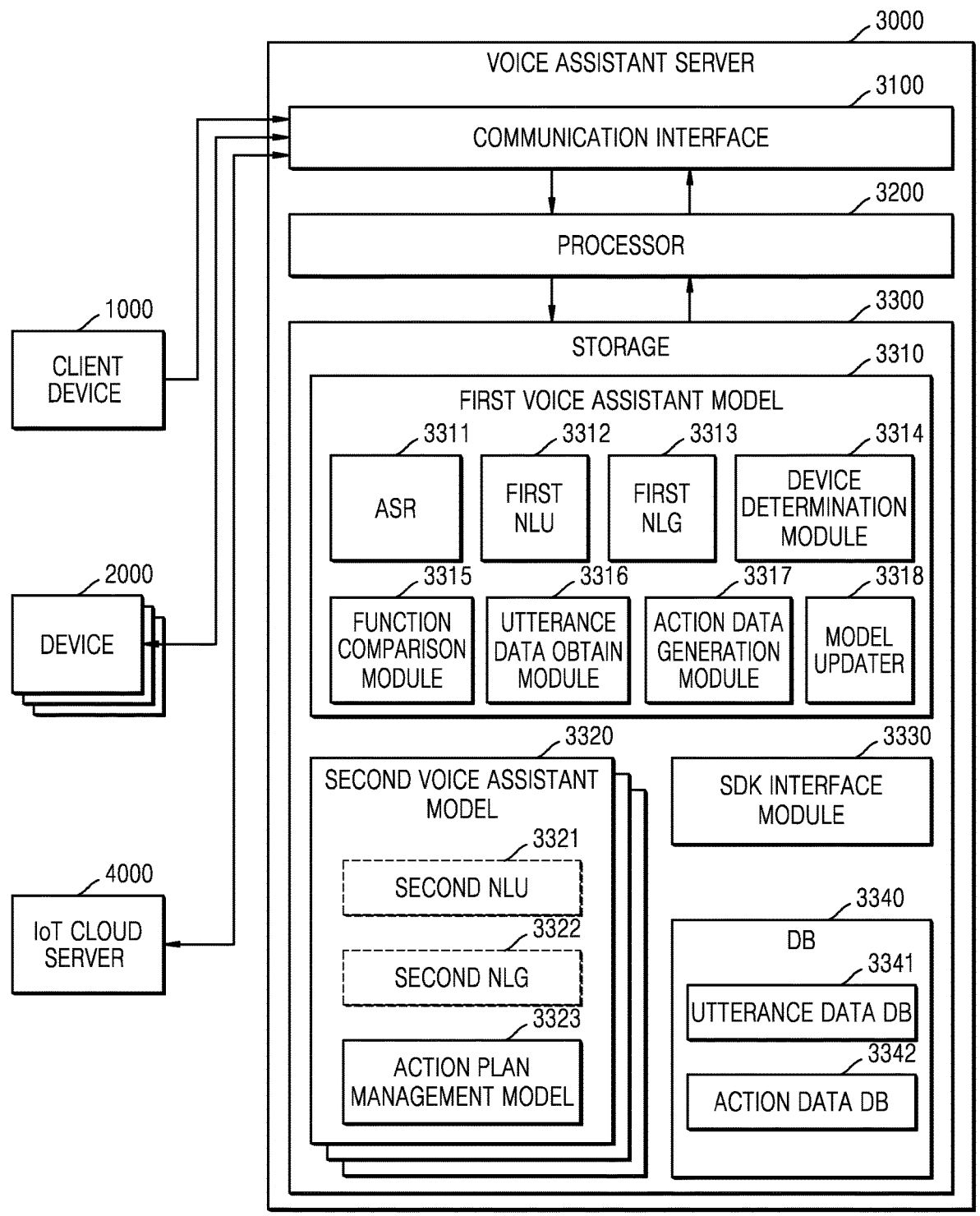
FIG. 13 is a block diagram of a voice assistant server, according to an embodiment of the disclosure.

FIG. 13 is a block diagram of a voice assistant server, according to an embodiment of the disclosure.

Referring to FIG. 13, the voice assistant server 3000 may include a communication interface 3100, a processor 3200, and a storage 3300. The storage 3300 may include a first voice assistant model 3310, at least one second voice assistant model 3320, an SDK interface module 3330, and a database (DB) 3340.

The communication interface 3100 communicates to send data to and receive data from the client device 1000, the device 2000, and the IoT cloud server 4000. For example, the communication interface 3100 may include one or more networking hardware and software components for performing wired or wireless communication with the client device 1000, the device 2000, and the IoT cloud server 4000.

The processor 3200 controls the general operation of the voice assistant server 3000. For example, the processor 3200 may control the function of the voice assistant server 3000 by loading programs stored in the storage 3300 into memory of the voice assistant server 3000 and executing the loaded programs.

The storage 3300 may store a program for control of the processor 3200, and store data related to the function of the new device 2900. The storage 3300 may include at least one type of storage medium including a flash memory, a hard disk, a multimedia card micro type memory, a card type memory (e.g., SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk.

Programs stored in the storage 3300 may be classified into a plurality of modules according to the functions, e.g., into the first voice assistant model 3310, the at least one second voice assistant model 3320, the SDK interface module 3330, etc.

The first voice assistant model 3310 is a model for determining a target device related to the intent of the user by analyzing a voice input of the user. The first voice assistant model 3310 may include an automatic speech recognition (ASR) model 3311, a first NLU model 3312, a first NLG model 3313, a device determination module 3314, a function comparison module 3315, an utterance data obtain module 3316, an action data generation module 3317, and a model updater 3318.

The ASR model 3311 converts a voice signal to text by performing ASR. The ASR model 3311 may leverage a predefined model such as an acoustic model (AM) or a language model (LM) to perform ASR that converts the voice signal to computer readable text. When an acoustic signal with noise is received from the client device 110, the ASR model 3311 may obtain a voice signal by canceling the noise from the received acoustic signal and perform ASR on the optimized voice signal.

The first NLU model 3312 analyzes the text and determines a first intent related to the user's intent based on the analysis result. The first NLU model 3312 may be a model trained to interpret text and obtain the first intent corresponding to the text. The intent may be information indicating an intent of the user's utterance included in the text.

The device determination model 3314 may perform syntactic analysis or semantic analysis using the first NLU model 3312 to determine the first intent of the user from the converted text. In an embodiment of the disclosure, the device determination model 3314 may parse the converted text into a unit of morpheme, word or phrase using the first model 3312, and infer the meaning of words extracted from the parsed text using linguistic characteristics (e.g., syntactic elements) of the parsed morpheme, word, or phrase. The device determination model 3314 may determine the first intent corresponding to the inferred meaning of the words by comparing the meaning of the inferred words with predefined intents provided from the first NLU model 3312. The device determination model 3314 may determine a type of target device based on the first intent. In an embodiment of the disclosure, the device determination model 3314 may determine a type of target device by using the first intent obtained using the first NLU model 3312. The device determination model 3314 provides the parsed text and target device information to the second voice assistant model 3320. In an embodiment of the disclosure, the device determination model 3314 may provide identification information (e.g., a device ID) of the determined target device with the parsed text to the second voice assistant model 3320.

The first NLG model 3313 may register a function of the new device 2900 and generate a query message for generating or editing utterance data.

The function comparison module 3315 may compare functions of the pre-registered device 2000 with functions of the new device 2900. The function comparison module 3315 may determine whether a function of the pre-registered device 2000 is the same as or similar to a function of the new device 2900. The function comparison module 3315 may identify any function of the new device 2900 that is the same as or similar to a function of the pre-registered device 2000.

The function comparison module 3315 may identify a title indicating a function supported by the new device 2900 from the technical specifications of the new device 2900, and determine whether the identified title is the same as or similar to a title of a function supported by the pre-registered device 2000. In this case, the database 3340 may store information about titles and analogous terms indicating certain functions, and determine based on the stored information about analogous terms whether the function of the pre-registered device 2000 and the function of the new device 2900 are the same or similar to each other.

Furthermore, the function comparison module 3315 may determine whether the functions are the same or similar to each other by referring to utterance data stored in the database 3340. The function comparison module 3315 may determine whether the function of the new device 2900 is the same as or similar to the function of the pre-registered device 2000 using the utterance data related to the function of the pre-registered device 2000. In this case, the function comparison module 3315 may interpret utterance data using the first NLU model, and determine whether the function of the new device 2900 is the same as or similar to the function of the pre-registered device 2000 based on the meaning of words included in the utterance data.

The function comparison module 3315 may determine whether a single function of the pre-registered device 2000 is the same as or similar to a single function of the new device 2900. The function comparison module 3315 may determine whether a set of functions of the pre-registered device 2000 is the same as or similar to a set of functions of the new device 2900.

The utterance data obtain module 3316 may obtain utterance data related to a function of the new device 2900. The utterance data obtain module 3316 may extract from an utterance data database 3341 utterance data corresponding to the function determined to be the same as or similar to the function of the new device 2900 among functions of the pre-registered device 2000.

The utterance data obtain module 3316 may extract from the utterance data database 3341 utterance data corresponding to the set of functions determined to be the same as or similar to the function of the new device 2900 among sets of functions of the pre-registered device 2000. In this case, utterance data corresponding to a function of the pre-registered device 2000 and utterance data corresponding to a set of functions of the pre-registered device 2000 may be stored in the utterance data database 3341 in advance.

The utterance data obtain module 3316 may edit a function or a set of functions determined to be the same or similar and generate utterance data corresponding to the edited functions. The utterance data obtain module 3316 may combine functions determined to be the same or similar and generate utterance data corresponding to the combined functions. Furthermore, the utterance data obtain module 3316 may combine a function and a set of functions determined to be the same or similar and generate utterance data corresponding to the combined functions. Moreover, the utterance data obtain module 3316 may delete some of functions in the set of functions determined to be the same or similar and generate utterance data corresponding to the set of functions from which some of the functions are deleted.

The utterance data obtain module 3316 may expand the utterance data. The utterance data obtain module 3316 may generate analogous utterance data having the same meaning but different expressions from the extracted or generated utterance data by modifying the expression of the extracted or generated utterance data.

The utterance data obtain module 3316 may use the first NLG model 3313 to output a query for registering an additional function, generating or editing utterance data. The utterance data obtain module 3316 may provide a guide text or a guide voice data to a user for registering a function of the new device 2900 and generating utterance data to the user's device 2000 or the developer's device. The utterance data obtain module 3316 may provide a list of functions different from functions of the pre-registered device 2000 among the functions of the new device 2900 to the user's device 2000, or the developer's device. The utterance data obtain module 3316 may provide recommended utterance data related to at least some of the different functions to the user's device 2000 or the developer's device.

The utterance data obtain module 3316 may interpret a response to the query using the first NLU model 3312. The utterance data obtain module 3316 may generate utterance data related to functions of the new device 2900 based on the interpreted response. The utterance data obtain module 3316 may generate utterance data related to the functions of the new device 2900 using the interpreted user's response or the interpreted developer's response, and recommend the generated utterance data. The utterance data obtain module 3316 may select some of the functions of the new device 2900 and generate utterance data related to each of the selected functions. The utterance data obtain module 3316 may select some of the functions of the new device 2900 and generate utterance data related to a combination of the selected functions. The utterance data obtain module 3316 may generate utterance data related to a function of the new device 2900 using the first NLG model 3313 based on identifiers and attributes of the functions of the new device 2900.

The action data generation module 3317 may generate action data for the new device 2900 based on the same or similar functions and the utterance data. For example, when a function corresponding to the utterance data is a single function, the action data generation module 3317 may generate action data including a detailed operation representing the single function. In another example, when a function corresponding to the utterance data is a set of functions, the action data generation module 3317 may generate detailed operations representing the functions in the set and an execution order of the detailed operations. The action data generation module 3317 may generate the action data using the utterance data generated in relation to a new function of the new device 2900. The action data generation module 3317 may identify new functions of the new device 2900 related to the utterance data, and determine an execution order of the identified functions to generate action data corresponding to the generated utterance data. The generated action data may be mapped to the utterance data and the analogous utterance data The model updater 3318 may generate or update the second voice assistant model 3320 related to the new device 2900 using the utterance data and the action data. The model updater 3318 may generate or update the second voice assistant model 3320 related to the new device 2900 using utterance data related to a function of the new device 2900 corresponding to a function of the pre-registered device 2000, utterance data newly generated in relation to a function of the new device 2900, and the expanded utterance data and action data. The model updater 3318 may accumulate utterance data and action data related to the new device 2900 and store the result in the utterance data database 3341 and the action data database 3342. Furthermore, the model updater 3318 may generate or update a CAN, which is a capsule type database included in an action plan management model 3323.

The second voice assistant model 3320 is specific to a particular device, and may determine an operation to be performed by the target device corresponding to a voice input of the user. The second voice assistant model 3320 may include a second NLU model 3321, a second NLG model 3322, and action plan management model 3323. The voice assistant server 3000 may include a second voice assistant model 3320 for each device type.

The second NLU model 3321 is an NLU model specific to a particular device for analyzing text and determining a second intent related to the user's intent based on the analysis result. The second NLU model 3321 may interpret an input voice of the user taking into account functions of the device. The second NLU model 3321 may be a model trained to interpret text and obtain the second intent corresponding to the text.

The second NLG model 3322 may be an NLG model specific to a particular device for generating a query message required to provide the voice assistant service to the user. The second NLU model 3322 may generate a natural language for a dialog with the user taking into account the specific functions of the device.

The action plan management model 3323 is a model specific to a device for determining an operation to be performed by the target device corresponding to a voice input of the user. The action plan management model 3323 may plan operation information to be performed by the new device 2900 taking into account the specific functions of the new device 2900.

The action plan management model 3323 may select detailed operations to be performed by the new device 2900 and plan an execution order of the selected detailed operations based on the interpreted voice uttered by the user. The action plan management model 3323 may obtain operation information about detailed operations to be performed by the new device 2900 using the planning result. The operation information may be information relating to detailed operations to be performed by the device, correlations between the detailed operations, and an execution order of the detailed operations. The operation information may include, for example, functions to be performed by the new device 2900 to perform the detailed operations, an execution order of the functions, input values required to perform the functions, and output values output as a result of executing the functions.

The action plan management model 3323 may manage information regarding a plurality of detailed operations and relations between the plurality of detailed operations. A correlation between each of the plurality of detailed operations and another detailed operation may include information about another detailed operation to be executed before one detailed operation is executed to perform the one detailed operation.

The action plan management model 3323 may include a CAN, a database in a capsule format indicating operations of the device and correlations between the operations. The CAN may include functions to be performed by the device to perform a particular operation, an execution order of the functions, input values required to perform the functions, and output values output as a result of performing the functions, and may be implemented in an ontology graph including knowledge triples indicating concepts and relations between the concepts.

The SDK interface module 3330 may transmit data to or receive data from the client device 1000 or the developer's device through the communication interface 3100. The client device 1000 or the developer's device may have a certain SDK installed therein for registering a new device, and receive a GUI from the voice assistant server 3000 through the SDK. The processor 3200 may provide a GUI for registering a function of the new device 2900 and generating utterance data to the user's device 2000 or a developer's device through the SDK interface module 3330. The processor 3200 may receive the user's response input through a GUI provided for the user's device 2000 from the user's device 2000 through the SDK interface module 3330, or receive the developer's response input through a GUI provided for the developer's device from the developer's device through the SDK interface module 3330. The SDK interface module 3330 may transmit data to or receive data from the IoT cloud server 4000 through the communication interface 3100.

The database 3340 may store various information for a voice assistant service. The database 3340 may include the utterance data database 3341 and the action data database 3342.

The utterance data database 3341 may store utterance data related to functions of the client device 1000, the device 2000, and the new device 2900.

The action data database 3342 may store action data related to functions of the client device 1000, the device 2000, and the new device 2900. The utterance data stored in the utterance data database and the action data stored in the action data database 3342 may be mapped to each other.

Figure 14:
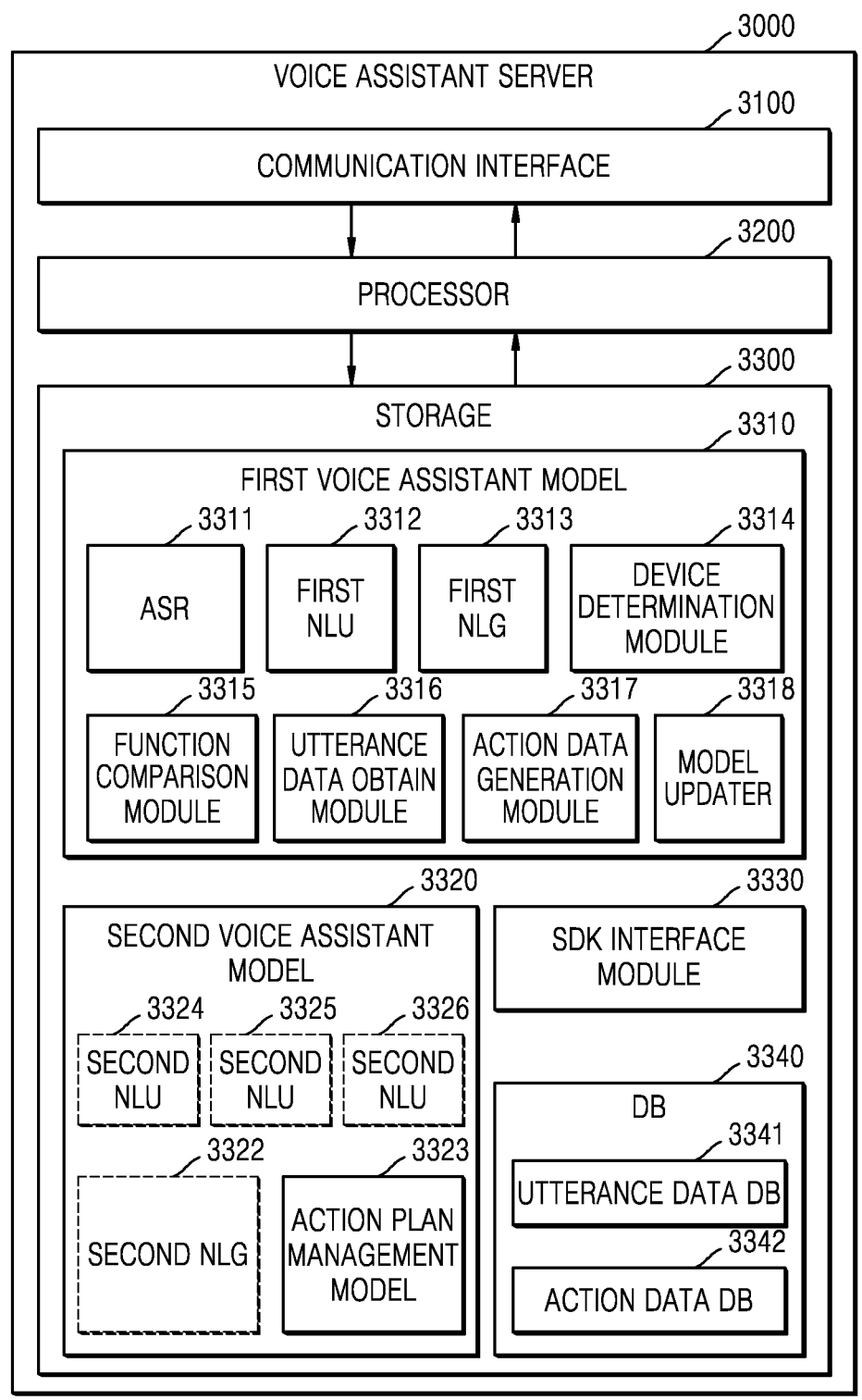
FIG. 14 is a block diagram of a voice assistant server, according to another embodiment of the disclosure.

FIG. 14 is a block diagram of a voice assistant server, according to another embodiment of the disclosure.

Referring to FIG. 14, the voice assistant server 3000 may include the second voice assistant model 3320. In this case, the second voice assistant model 3320 may include a plurality of second NLU models 3324, 3325, and 3326. The plurality of second NLU models 3324, 3325, and 3326 may be NLU models specific to each of various types of devices.

Figure 15:
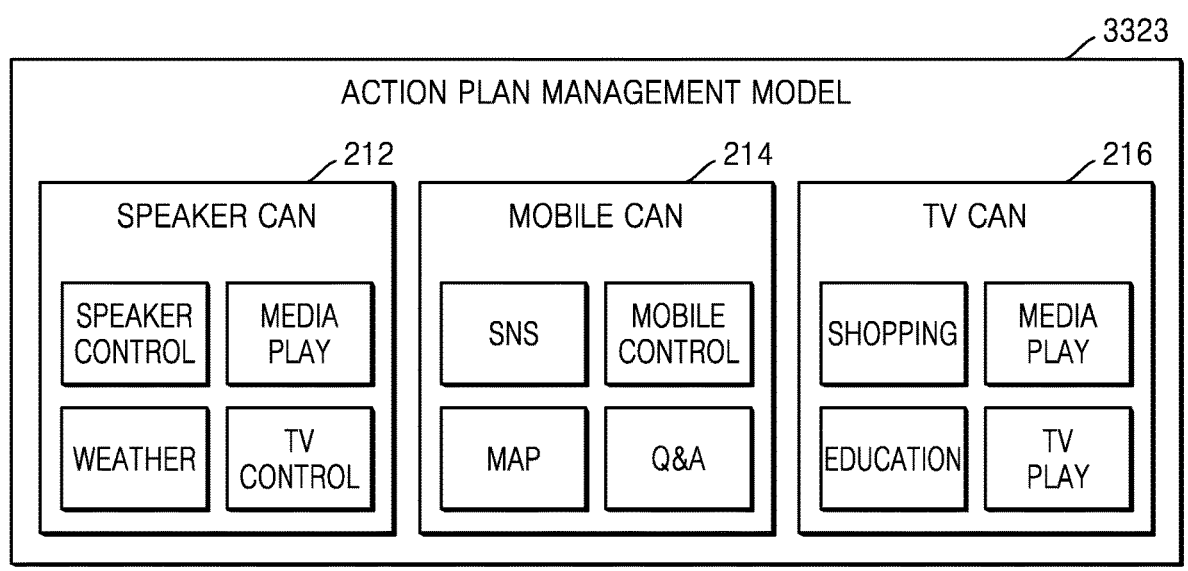
FIG. 15 is a conceptual diagram illustrating an action plan management model, according to an embodiment of the disclosure.

FIG. 15 is a conceptual diagram illustrating an action plan management model, according to an embodiment of the disclosure.

Referring to FIG. 15, the action plan base station 3323 may include a speaker CAN 212, a mobile CAN 214, and a TV CAN 216.

The speaker CAN 212 may include information regarding detailed operations including speaker control, media play, weather, and TV control, and may include an action plan storing a concept corresponding to each of the detailed operations in a capsule format.

The mobile CAN 214 may include information regarding detailed operations including a social networking service (SNS), mobile control, a map, and Q&A, and may include an action plan storing a concept corresponding to each of the detailed operations in a capsule format.

The TV CAN 216 may include information regarding detailed operations including shopping, media play, education, and TV play, and may include an action plan storing a concept corresponding to each of the detailed operations in a capsule format. In an embodiment of the disclosure, a plurality of capsules included in each of the speaker CAN 212, the mobile CAN 214, and the TV CAN 216 may be stored in a function registry, which is a constituent element in the action plan management model 3323.

In an embodiment of the disclosure, the action plan management model 3323 may include a strategy registry when the voice assistant server 3000 determines detailed operations corresponding to the second intent and the parameter determined by interpreting text converted from a voice input through the second NLU model. The strategy registry may include reference information to determine an action plan when multiple action plans are related to the text. In an embodiment of the disclosure, the action plan management model 3323 may include a follow-up registry, in which information about follow-up operations is stored, to suggest a follow-up operation to the user in a designated situation. The follow-up operation may include e.g., a follow-up utterance.

In an embodiment of the disclosure, the action plan management model 3323 may include a layout registry, in which layout information output by a target device is stored.

In an embodiment of the disclosure, the action plan management model 3323 may include a vocabulary registry, in which vocabulary information included in capsule information is stored. In an embodiment of the disclosure, the action plan management model 3323 may include a dialog registry, in which information about dialog or interaction with the user is stored.

Figure 16:
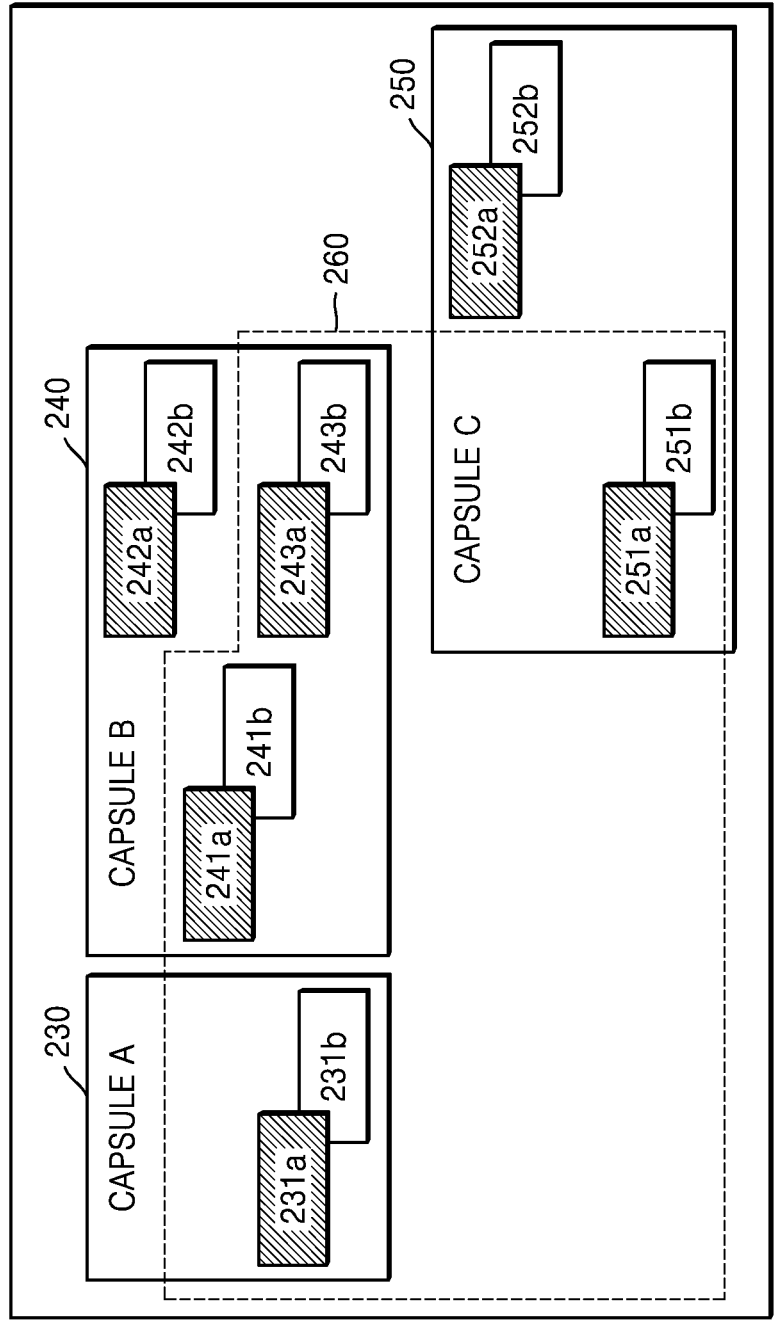
FIG. 16 illustrates a capsule database stored in an action plan management model, according to an embodiment of the disclosure.

FIG. 16 illustrates a capsule database stored in an action plan management model, according to an embodiment of the disclosure.

Referring to FIG. 16, a capsule database stores detailed operations and relation information about concepts corresponding to the detailed operations. The capsule database may be implemented in the form of a CAN. The capsule database may store a plurality of capsules 230, 240, and 250. The capsule database may store detailed operations to execute operations related to voice inputs of the user, input parameters required for the detailed operations, and output result values in the form of a CAN.

The capsule database may store information relating to operations for each device. In the embodiment of the disclosure as shown in FIG. 16, the capsule device may store the plurality of capsules 230, 240, and 250 related to operations performed by a particular device, e.g., a TV. In an embodiment of the disclosure, a capsule, e.g., capsule A 230, may correspond to an application. A capsule may include at least one detailed operation and at least one concept to perform a designated function. For example, the capsule A 230 may include a detailed operation 231a and a concept 231b corresponding to the detailed operation 231a, and a capsule B 240 may include a plurality of detailed operations 241a, 242a, and 243a, and a plurality of concepts 241b, 242b, and 243b respectively corresponding to the detailed operations 241a, 242a, and 243a.

The action plan management model 210 may use the capsule stored in the capsule database to generate an action plan for performing an operation related to a voice input of the user. For example, the action plan management model 210 may use the capsule stored in the capsule database to generate an action plan. For example, the action plan management model 210 may generate an action plan 260 related to operations to be performed by a device by using the detailed operation 231a and the concept 231b of the capsule A 230, some of the plurality of detailed operations 241a, 242a, and 243a and the plurality of concepts 241b, 242b, and 243b of the capsule B 240 (namely operations 241a and 241b and concepts 241b and 243b), and a detailed operation 251a and a concept 251b of a capsule C 250. Of course, any combination of operations and concepts from among the operations and concepts of the capsules (230, 240, 250) may be selected for generation of the action plan 260.

Figure 17:
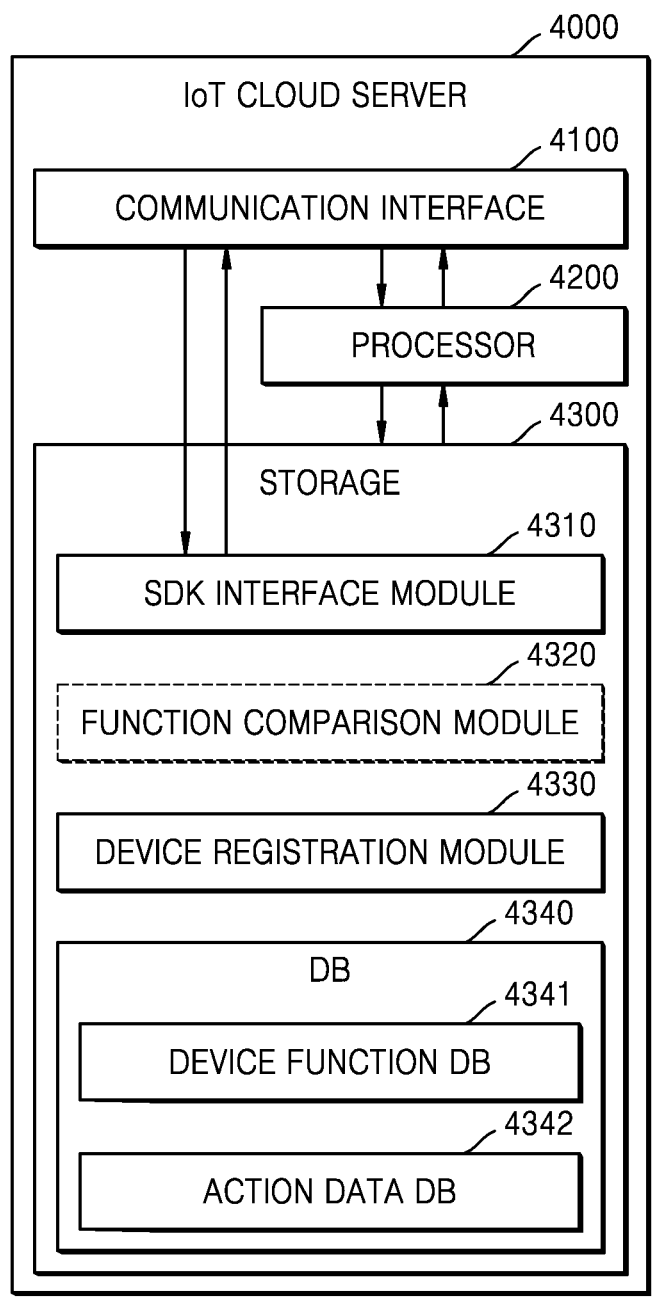
FIG. 17 is a block diagram of an Internet of Things (IoT) cloud server, according to an embodiment of the disclosure.

FIG. 17 is a block diagram of an IoT cloud server, according to an embodiment of the disclosure.

Referring to FIG. 17, the IoT cloud server 4000 may include a communication interface 4100, a processor 4200, and a storage 4300. The storage 4300 may include an SDK interface module 4310, a function comparison module 4320, a device registration module 4330, and a database 4340. The database 4340 may include a device function database 4341 and an action data database 4342.

The communication interface 4100 communicates with the client device 1000, the device 2000, and the voice assistant server 3000. The communication interface 4100 may include one or more networking hardware and software components for performing wired or wireless communication with the client device 1000, the device 2000, and the voice assistant server 3000.

The processor 4200 controls the general operation of the IoT cloud server 4000. For example, the processor 4200 may control the function of the IoT cloud server 4000 by loading programs stored in the storage 4300 into memory and executing the programs loaded into memory.

The storage 4300 may store a program to provide control of the processor 4200, and store data related to the function of the device 2000. The storage 4300 may include at least one type of storage medium including a flash memory, a hard disk, a multimedia card micro type memory, a card type memory (e.g., SD or XD memory), a RAM, an SRAM, a ROM, an EEPROM, a PROM, a magnetic memory, a magnetic disk, and an optical disk.

Programs stored in the storage 4300 may be classified into a plurality of modules according to the functions, e.g., the SDK interface module 4310, the function comparison module 4320, the device registration module 4330, etc.

The SDK interface module 4310 may transmit data to or receive data from the voice assistant server 3000 through the communication interface 4100. The processor 4200 may provide function information of the device 2000 to the voice assistant server 3000 through the SDK interface module 4310.

When the function comparison module 4320 is included in the IoT cloud server 4000, the function comparison module 4320 may serve as the aforementioned function comparison model 3315 of the voice assistant server 3000 according to a client-server or cloud-based model.

In this case, the function comparison module 4320 may compare functions of the pre-registered device 2000 with functions of the new device 2900. The function comparison module 4320 may determine whether a function of the pre-registered device 2000 is the same as or similar to a function of the new device 2900. The function comparison module 4320 may identify any function of the new device 2900 that is the same as or similar to a function of the pre-registered device 2000.

The function comparison module 4320 may identify a title indicating a function supported by the new device 2900 from the technical specifications of the new device 2900, and determine whether the identified title is the same as or similar to a title of a function supported by the pre-registered device 2000. In this case, the database 4340 may store information about titles and analogous terms indicating certain functions, and determine based on the stored information about analogous terms whether the function of the pre-registered device 2000 and the function of the new device 2900 are the same or similar to each other.

Furthermore, the function comparison module 4320 may determine whether the functions are the same or similar to each other by referring to utterance data stored in the database 4340. The function comparison module 3315 may determine whether the function of the new device 2900 is the same as or similar to the function of the pre-registered device 2000 using the utterance data related to the function of the pre-registered device 2000. The function comparison module 4320 may determine whether a single function of the pre-registered device 2000 is the same as or similar to a single function of the new device 2900. The function comparison module 4320 may determine whether a set of functions of the pre-registered device 2000 is the same as or similar to a set of functions of the new device 2900.

The device registration module 4330 may register a device for a voice assistant service. When the new device 2900 is identified, the device registration module 4330 may receive information about functions of the new device 2900 from the voice assistant server 3000 and register the received information in the database 4330. The information about the functions of the new device 2900 may include e.g., functions supported by the new device 2900, action data related to the functions, etc., without being limited thereto.

The database 4340 may store device information required for a voice assistant service. The database 4340 may include a device function database 4341 and an action data database 4342. The device action data database 4340 may store function information of the client device 1000, the device 2000, and the new device 2900. The function information may include information about ID values of device functions, and titles and attributes of the functions, without being limited thereto. The action data database 4342 may store action data related to the functions of the client device 1000, the device 2000, and the new device 2900.

Figure 18:
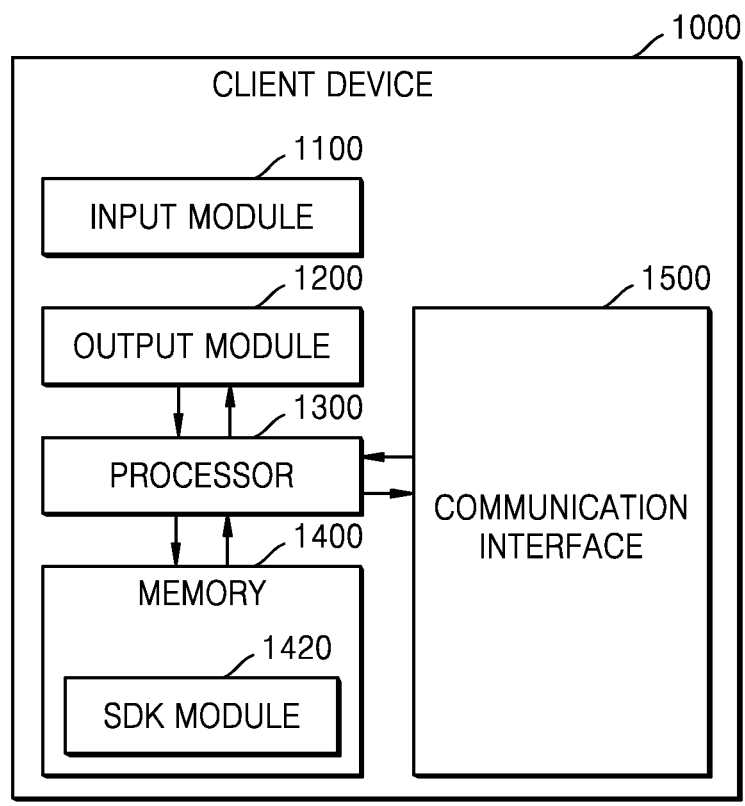
FIG. 18 is a block diagram of a client device, according to an embodiment of the disclosure.

FIG. 18 is a block diagram of a client device, according to an embodiment of the disclosure.

Referring to FIG. 18, in an embodiment of the disclosure, the client device 1000 may include an input module 1100, an output module 1200, a processor 1300, a memory 1400, and a communication interface 1500. The memory 1400 may include an SDK module 1420.

The device 2000 may operate as the client device 1000, or the new device 2900 may operate as the client device 1000 after being pre-registered. The device 2000 or the new device 2900 may also include the components as shown in FIG. 18.

The input module 1100 refers to hardware and/or software that allows the user to enter data to control the client device 1000. For example, the input module 1100 may include a key pad, a dome switch, a (capacitive, resistive, infrared detection type, surface acoustic wave type, integral strain gauge type, piezoelectric effect type) touch pad, a jog wheel, a jog switch, a graphical user interface (GUI) displayed on a display, an audio user interface provided by audio to a user, etc., without being limited thereto.

The input module 1100 may receive a user input to register the new device 2900.

The output module 1200 may output an audio signal, a video signal, or a vibration signal, and the output module 1210 may include at least one of a display, a sound output, or a vibration motor. The input module 1100 and the output module 1200 may be combined into an input/output interface, such as a touch screen display for receiving user input and displaying output information to the user. Of course, any combination of software and hardware components may be provided to perform the input/output functions between the client device 1000 and the user.

The processor 1300 controls the general operation of the client device 1000. For example, the processor 1300 may execute programs loaded from the memory 1400 to generally control the user input module 1100, the output module 1200, the memory 1400, and the communication interface 1500.

The processor 1300 may request the user for an input to register a function of the new device 2900. The processor 1300 may perform an operation to register the new device 2900 with the voice assistant server 300 by controlling the SDK module 1420.

The processor 1300 may receive a query message for generating and editing utterance data related to a function of the new device 2900 from the voice assistant server 3000 and output the query message. The processor 1300 may provide a list of functions different from functions of the pre-registered device 1300 among the functions of the new device 2900 to the user. The processor 1300 may provide recommended utterance data related to at least some of the functions of the new device 2900 to the user via the output module 1200.

The processor 1300 may receive a user's response to a query message via the input module 1100. The processor 1300 may provide the user's response for the voice assistant server 3000 to generate utterance data and action data related to the functions of the new device 2900.

The communication interface 1500 may include one or more hardware and/or software communication components that allow communication with the voice assistant server 3000, the IoT cloud server 4000, the device 2000, and the new device 2900. For example, the communication interface 1500 may include a short-range communication module (infrared, WiFi, etc.), a mobile communication module (4G, 5G, etc.), and a broadcast receiver.

The short-range communication module may include a Bluetooth communication module, a Bluetooth low energy (BLE) communication module, an NFC module, a wireless LAN (WLAN), e.g., Wi-Fi, communication module, a Zigbee communication module, an IrDA communication module, a WFD communication module, a UWB communication module, an Ant+communication module, etc., without being limited thereto.

The mobile communication module transmits and receives RF signals to and from at least one of a base station, an external terminal, or a server in a mobile communication network. The RF signal may include a voice call signal, a video call signal or different types of data involved in transmission/reception of a text/multimedia message.

The broadcast receiver receives broadcast signals and/or broadcasting-related information from the outside on a broadcasting channel. The broadcasting channel may include a satellite channel or a terrestrial channel. Depending on the implementation, the client device 1000 may not include the broadcast receiver.

The memory 1400 may store programs for processing and control of the processor 1300, or store data input to or output from the client device 1000.

The storage 1400 may include at least one type of storage medium including a flash memory, a hard disk, a multimedia card micro type memory, a card type memory (e.g., SD or XD memory), a RAM, an SRAM, a ROM, an EEPROM, a PROM, a magnetic memory, a magnetic disk, and an optical disk.

Programs stored in the memory 1400 may be classified into a plurality of modules according to the functions, e.g., the SDK module 1420, a UI module, a touch screen module, a notification module, etc.

The SDK module 1420 may be executed by the processor 1300 to perform an operation required to register the new device 2900. The SDK module 1420 may be downloaded from the voice assistant server 300 and installed in the client device 1000. The SDK module 1420 may output a GUI on a screen of the client device 1000 for registering the new device 2900. When the client device 1000 does not include any display module, the SDK module 1420 may allow the client device 1000 to output a voice message for registering the new device 2900. The SDK module 1420 may allow the client device 1000 to receive a response from the user and provide the response to the voice assistant server 3000.

Embodiments of the disclosure may be implemented in the form of a computer-readable recording medium that includes computer-executable instructions such as the program modules executed by the computer. The computer-readable recording medium may be an arbitrary available medium that may be accessed by the computer, including volatile, non-volatile, removable, and non-removable mediums. The computer-readable recording medium may also include a computer storage medium and a communication medium. The volatile, non-volatile, removable, and non-removable mediums may be implemented by an arbitrary method or technology for storage of information, such as computer-readable instructions, data structures, program modules, or other data. The communication medium may include other data of modulated data signals such as computer-readable instructions, data structures, or program modules.

In the specification, the term "module" may refer to a hardware component such as a processor or a circuit, and/or a software component executed by the hardware component such as the processor.

Several embodiments of the disclosure have been described, but a person of ordinary skill in the art will understand and appreciate that various modifications can be made without departing the scope of the disclosure. Thus, it will be apparent to those of ordinary skill in the art that the disclosure is not limited to the embodiments of the disclosure described, but can encompass not only the appended claims but the equivalents. For example, an element described in the singular form may be implemented as being distributed, and elements described in a distributed form may be implemented as being combined.

The scope of the disclosure is defined by the appended claims, and it will be understood by those of ordinary skill in the art that various changes in form and details may be made without departing from the spirit and scope of the disclosure as defined by the appended claims and their equivalents.

What is claimed is:

1. A method, performed by a server, of registering a new device for a voice assistant service, the method comprising:
   obtaining a first technical specification indicating first functions of a pre-registered device and a second technical specification indicating second functions of the new device;
   comparing the first functions of the pre-registered device with the second functions of the new device, based on the first technical specification and the second technical specification;
   based on the comparing results, identifying the second functions of the new device that are different from the first functions of the pre-registered device as additional functions;
   outputting a query for registering an additional function using a natural language generation (NLG) model;
   interpreting a response to the query using a natural language understanding (NLU) model;
   generating utterance data related to the additional functions of the new device based on the interpreted response;
   generating first action data for the new device using the generated utterance data; and
   storing the utterance data and the first action data in association with the new device,
   wherein the first action data comprises data related to a series of detailed operations of the new device corresponding to the utterance data.

2. The method of claim 1, wherein the outputting of the query comprises providing guide text or guide voice data to the user for registering the additional functions of the new device to a client device.

3. The method of claim 2, the method further comprises providing a list of the additional functions different from the functions of the pre-registered device among the functions of the new device to the client device.

4. The method of claim 2, wherein the outputting of the query comprises providing the query for receiving an utterance sentence related to the additional function of the new device to the client device.

5. The method of claim 2, wherein the outputting of the query comprises providing the query for informing the additional function of the new device to the client device.

6. The method of claim 1, wherein the generating of the utterance data comprises obtaining analogous utterance data related to generated utterance data by entering the generated utterance data to an AI model.

7. The method of claim 1, further comprising:
   based on the comparing results, identifying the third functions of the pre-registered device that match the fourth functions of the new device as matching functions;
   obtaining pre-registered utterance data related to the matching functions;
   generating second action data for the new device based on the matching functions and the pre-registered utterance data; and
   storing the pre-registered utterance data and the second action data in association with the new device.

8. A server for registering a new device for a voice assistant service, the server comprising:
   a communication interface;
   a memory storing a program including one or more instructions; and
   a processor configured to execute the one or more instructions of the program stored in the memory to control the server to:
   obtain a first technical specification indicating first functions of a pre-registered device and a second technical specification indicating second functions of the new device,
   compare the first functions of the pre-registered device with the second functions of the new device, based on the first technical specification and the second technical specification,
   based on the comparing results, identify the second functions of the new device that are different from the first functions of the pre-registered device as additional functions,
   output a query for registering an additional function using a natural language generation (NLG) model,
   interpret a response to the query using a natural language understanding (NLU) model,
   generate utterance data related to the additional functions of the new device based on the interpreted response,
   generate first action data for the new device using the generated utterance data, and
   store the utterance data and the first action data in association with the new device,
   wherein the first action data comprises data related to a series of detailed operations of the new device corresponding to the utterance data.

9. The server of claim 8, wherein the processor executing the one or more instructions is further configured to provide guide text or guide voice data to the user for registering the additional functions of the new device to a client device.

10. The server of claim 9, wherein the processor executing the one or more instructions is further configured to provide a list of the additional functions different from the functions of the pre-registered device among the functions of the new device to the client device.

11. The server of claim 9, wherein the processor executing the one or more instructions is further configured to provide the query for receiving an utterance sentence related to the additional function of the new device to the client device.

12. The server of claim 9, wherein the processor executing the one or more instructions is further configured to provide the query for informing the additional function of the new device to the client device.

13. The server of claim 8, wherein the processor executing the one or more instructions is further configured to obtain analogous utterance data related to generated utterance data by entering the generated utterance data to an AI model.

14. The server of claim 8, wherein the processor executing the one or more instructions is further configured to:
- based on the comparing results, identify the third functions of the pre-registered device that match the fourth functions of the new device as matching functions,
- obtain pre-registered utterance data related to the matching functions,
- generate second action data for the new device based on the matching functions and the pre-registered utterance data, and
- store the pre-registered utterance data and the second action data in association with the new device.

15. A non-transitory computer-readable recording medium having a program recorded thereon for a computer to execute the method of claim 1.

* * * * *